United States Patent [19]
Katayama et al.

[11] Patent Number: 5,416,558
[45] Date of Patent: May 16, 1995

[54] CAMERA WITH SHAKE PREVENTING APPARATUS

[75] Inventors: Akira Katayama, Koganei; Yoshio Imura, Kawasaki, both of Japan

[73] Assignee: Nikon Corporation, Tokyo, Japan

[21] Appl. No.: 170,992

[22] Filed: Dec. 21, 1993

Related U.S. Application Data

[63] Continuation of Ser. No. 959,106, Oct. 9, 1992, abandoned.

[30] Foreign Application Priority Data

| | | | |
|---|---|---|---|
| Oct. 16, 1991 | [JP] | Japan | 3-296234 |
| Nov. 15, 1991 | [JP] | Japan | 3-327162 |
| Jan. 24, 1992 | [JP] | Japan | 4-032998 |
| Mar. 6, 1992 | [JP] | Japan | 4-020727 U |

[51] Int. Cl.⁶ ............................................. G03B 5/00
[52] U.S. Cl. .................................... 354/446; 354/430; 354/70; 354/195.1; 354/435; 348/208
[58] Field of Search ............... 354/430, 400, 402, 406, 354/407, 408, 286, 195.1, 70, 410, 435, 446; 348/208

[56] References Cited

U.S. PATENT DOCUMENTS

| | | | |
|---|---|---|---|
| 4,901,096 | 2/1990 | Lemelson | 354/268 |
| 4,965,619 | 10/1990 | Shikaumi et al. | 354/430 |
| 5,101,230 | 3/1992 | Shikaumi et al. | 354/430 |
| 5,172,276 | 12/1992 | Ueyama et al. | 359/813 |
| 5,210,563 | 5/1993 | Hamada et al. | 354/400 |

FOREIGN PATENT DOCUMENTS 2-282717 11/1990 Japan.
2-304535 12/1990 Japan.

Primary Examiner—Russell E. Adams
Attorney, Agent, or Firm—Shapiro and Shapiro

[57] ABSTRACT

A camera includes an aperture stop or lens shutter mechanism unit, a base on which the mechanism unit is mounted, a shake correction lens juxtaposed with a photographing lens in an optical axis direction, and a driving unit for moving the shake correction lens in a direction perpendicular to the optical axis direction, and the driving unit is arranged on the base. The shake correction operation is preferably started at a time between the completion of a focusing operation and the start of an exposure operation.

24 Claims, 18 Drawing Sheets

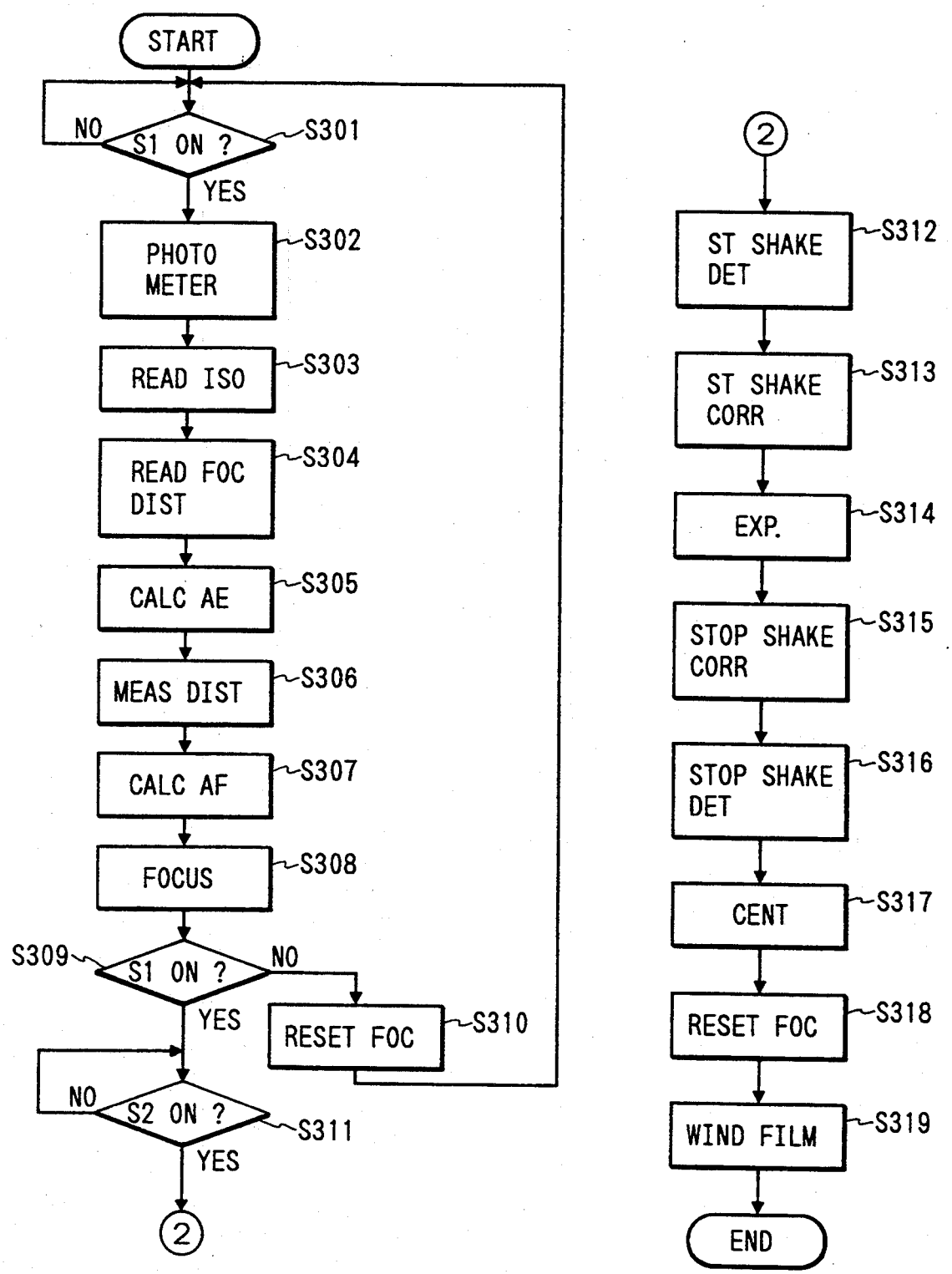

CAMERA WITH SHAKE PREVENTING APPARATUS

This is a continuation of application Ser. No. 959,106, filed Oct. 9, 1992, now abandoned.

BACKGROUND OF THE INVENTION

1. Field of the Invention

The present invention relates to a camera with a shake preventing apparatus.

2. Related Background Art

As a conventional camera with a shake preventing apparatus, a single-lens reflex camera with a single focal point exchangeable lens having a shake preventing optical system for preventing an image blur on an image plane by decentering a lens group immediately after an aperture stop is known.

In this exchangeable lens, a driving mechanism and an actuator for decentering a shake correction lens are arranged behind the aperture stop.

However, the conventional camera with the shake preventing apparatus poses the following problems since the driving mechanism and the actuator for decentering the shake correction lens are arranged on a base behind the aperture stop.

Upon application to a lens shutter camera with a zoom lens, since a lens shutter unit is moved in the optical axis direction according to a zooming operation, a unit with the driving mechanism and actuator for the shake correction lens must be able to be moved in the optical axis direction according to the zooming operation, resulting in a complicated structure, an increase in size of the camera, and high cost.

Since the actuator for decentering is arranged, the diameter of a lens barrel is increased accordingly, resulting in an increase in size of the camera.

FIG. 8 is a perspective view showing a shake correction apparatus, and FIGS. 9A and 9B are charts showing an optical system of a photographing lens.

A camera shown in FIG. 8 has a camera main body 116, a photographing lens barrel 117, a distance-measurement window 118, a finder window 119, and a release button 120.

The camera body 116 includes angular speed sensors 105 and 106. With reference to the principal point H of the photographing lens barrel 117, the angular speed sensor 105 detects an angular speed of rotation of the camera main body 116 about the Y axis, and the angular speed sensor 106 detects an angular speed of rotation of the camera main body 116 about the X axis. The shake correction apparatus obtains the direction and speed of an image blur on an imaging plane 143 on the basis of the angular speed data detected by the angular speed sensors 105 and 106.

An optical system shown in FIGS. 9A and 9B comprises a 2-group zoom lens. Convex lenses L1 and L2 constitute a first lens group, and a concave lens L3 constitutes a second lens group. FIG. 9A shows a wide-end state, and FIG. 9B shows a telephoto-end state.

The convex lens L2 is used as a shake correction lens (to be referred to as a shake correction lens L2 hereinafter), and is shifted in a direction of an arrow A on the basis of the direction and speed data of the image blur on the imaging plane 143. Appropriate shift direction and amount are selected to correct the image blur on the imaging plane 143.

The convex lens L1 is a focusing lens, and is moved in a direction of an arrow B to perform a focusing operation. Note that sectors of a lens shutter are designated by 140 and 141.

The shake correction apparatus described above starts a shake correction operation simultaneously with the start of exposure, when a main switch is turned on, or when a release button is depressed to its half-stroke position. For this reason, the following problems are posed.

① When the shake correction operation is started simultaneously with the start of exposure, the shake correction operation cannot be precisely performed due to the influence of the inertia of the shake correction lens and its driving system.

FIG. 7A is a graph showing the relationship among the time, a shake amount R, and a correction amount C when the shake correction operation is started simultaneously with the start of exposure.

In FIG. 7A, a solid line represents the detected shake amount R, and a broken curve represents the correction amount C. The shake correction apparatus shifts the shake correction lens L2, so that a correction amount $\Delta 1$ becomes equal to a shake amount $\Delta 0$ indicated by a solid line after the end of exposure. However, the correction speed is insufficient in the early stage of correction, as indicated by a broken curve in FIG. 7A, due to the influence of the inertia of the shake correction lens L2 itself or a driving mechanism for driving the lens L2.

Therefore, the shake amount $\Delta 0$ within the exposure time becomes a correction amount $\Delta 1$ smaller than the amount $\Delta 0$, and the shake correction operation cannot be precisely performed.

② When the shake correction operation is started when the main switch is turned on or when the release button is depressed to its half-stroke position, a shake correction state can be confirmed through a finder in a single-lens reflex camera. However, in a compact camera, since the photographing screen is not directly observed, the shake correction state cannot be confirmed, and electric power is consumed even during this interval, thus shortening the service life of a battery.

In addition, photometry and distance-measurement operations must be simultaneously performed, and the processing capacity of a control circuit must be increased by that for the shake correction.

Currently manufactured cameras have remarkable electronic functions such as an auto-exposure mechanism, an auto-focus mechanism, and the like, and can perform highly automated operations. However, a camera of this type cannot provide a sufficient automatic function as a countermeasure against an image blur due to a camera shake, which occurs in a hand-held photographing state. For a conventional camera of this type, the proposals to be described below have been made.

The proposals will be briefly described below. When a proper photographing operation is to be performed, the influence of, e.g., a camera shake at the side of a photographer who holds the camera must be taken into consideration. Thus, a shake detection means is arranged, and an alarm display of a shake state is made on the basis of the detection result under a condition that a shake occurs.

A technique for performing control on the basis of the detection result of shake detection means to inhibit a photographing operation under a shake occurrence condition is also proposed in, e.g., U.S. Pat. No. 4,901,096.

Furthermore, in still another proposal, a camera is mounted on an anti-shake base which can absorb an external vibration, thereby eliminating the influence of a shake.

In still another proposal, a gyro for generating an inertia is attached to a camera.

However, the above-mentioned conventional countermeasures against an image blur cannot avoid the following problems.

When only an alarm display of a shake state is made, a photographer can confirm a camera shake. However, the camera shake cannot be directly avoided, and a photographing operation free from an image blur cannot be performed.

When a photographing operation is inhibited in a camera shake state, the photographing condition is limited, and a photographer may lose a shutter chance.

Furthermore, when the anti-shake base or the gyro is utilized, not only the entire size is increased, but also cost is increased. Thus, such a structure is not suitable for a compact camera using a 35-mm film.

For this reason, an apparatus for movably controlling a portion of an optical system as a correction optical system according to the detection result of the above-mentioned shake detection means so as to prevent an image blur on a film imaging plane as much as possible is also proposed. However, this correction mechanism has a complicated structure, and makes the entire structure bulky. In addition, this apparatus suffers from a problem upon movable control of the correction optical system in a desired state. Thus, it is demanded to take some countermeasure for solving all these problems.

As a shake correction apparatus, for example, the following apparatus is known. That is, angular speed sensors are provided to a camera main body or a lens, and angular speeds in the X- and Y-directions are detected by the angular speed sensors, as shown in FIG. 8. The direction and speed of an image blur on the imaging plane are obtained based on the detected angular speeds, and a shake correction lens is shifted according to the obtained direction and speed.

SUMMARY OF THE INVENTION

It is an object of the present invention to provide a camera with a shake preventing (correction) apparatus, which can mount a driving mechanism and an actuator for a shake correction lens with a simple arrangement, can prevent an increase in diameter of a lens barrel even with the actuator for decentering, and can realize a compact structure.

It is another object of the present invention to provide a shake correction apparatus, which can perform a shake correction operation with high precision without increasing power consumption and the load on a control circuit, and is suitable for a compact camera.

It is still another object of the present invention to provide a shake preventing apparatus, which can reliably prevent an image blur caused by, e.g., a camera shake, has a simple, compact, and low-cost structure, which can be assembled in a limited space, and is suitably applied to a 35-mm lens shutter camera.

It is still another object of the present invention to provide a lens driving apparatus which has a simple structure, and contributes to a decrease in size of a lens barrel.

In a camera with a shake preventing apparatus according to the present invention, a driving mechanism and an actuator for a shake correction lens are arranged on a base on which an aperture stop mechanism unit is mounted, or a base arranged integrally with the base.

The camera with the shake preventing apparatus according to the present invention has a photographing lens comprising a vibration preventing optical system for preventing an image blur on an image plane by decentering a lens group located immediately after aperture blades (or sectors), and at least a portion of an actuator for driving the lens group is arranged in front of the aperture blades.

In this case, the position of the aperture blades in the optical axis direction is regulated, the actuator is arranged on one of bases arranged before and after the aperture blades, and a guide member for decentering the lens group is arranged on the base after the aperture blades.

A vibration detection means for detecting a vibration of the camera is arranged on the base after the aperture blades.

Furthermore, the aperture blades include two blades, and the centers of rotation of the actuator and the aperture blades are arranged to be substantially symmetrical about an axis perpendicular to a line connecting the centers of rotation of the two aperture blades, and passing the optical axis of the photographing lens.

According to the present invention, since the driving mechanism and the actuator for a shake correction lens, and the vibration detection means are arranged on a base with a shutter mechanism unit, or a base arranged integrally with the base, a structure can be prevented from being complicated.

Since the camera has the photographing lens comprising the vibration preventing optical system for preventing an image blur on the image plane by decentering the lens group located immediately after the aperture blades, and at least a portion of the actuator for driving the lens group is arranged in front of the aperture blades, i.e., at a position where a light beam is most focused, the diameter of the lens barrel can be decreased as compared to cases wherein the actuator is arranged at other positions.

A shake correction apparatus according to another aspect of the present invention comprises a distance-measurement means for measuring a distance to an object, a focusing means for performing a focusing operation on the basis of the distance-measurement result of the distance-measurement means, a shutter means for controlling an exposure time, a shake detection means for detecting a shake amount of an image on an imaging plane, a shake correction means for preventing an image blur by driving a shake correction lens on the basis of the detection result of the shake detection means, and a shake control means for starting the operation of the shake correction means during an interval between the end of the focusing operation of the focusing means and the start of exposure by the shutter means.

In this case, the shake detection means detects the shake amount using an angular speed sensor.

According to the present invention, the driving operation of the shake correction lens is started before the start of exposure so that the early stage of a correction operation with an insufficient correction speed does not overlap the exposure operation. For this reason, the exposure operation can be performed while the shake correction is being executed, and the shake correction can be performed with high precision.

Since the driving operation of the correction lens is started after the end of the focusing operation, power consumption can be decreased as compared to a case wherein the shake correction is started when a main switch is turned on or when a release button is depressed to its half-stroke position.

Furthermore, since photometry and distance-measurement operations have already been completed, the processing capacity of a control circuit need not be increased.

A shake preventing apparatus according to a further aspect the present invention comprises a shake preventing optical system which is moved in a direction perpendicular to the optical axis of a main optical system to prevent a shake, and a driving mechanism, driven by a control means according to a detection result from a shake detection means for detecting a shake, for driving the shake preventing optical system. The driving mechanism is constituted by a first driving means for driving a lens frame member for holding the shake preventing optical system in a first direction, and a second driving means for driving the lens frame member in a second direction different from the first direction. The first driving means has a first coupling member for driving the lens frame member in the first direction, and coupling the lens frame member to be movable in the second direction independently of the first driving means. The second driving means has a second coupling member for driving the lens frame member in the second direction, and coupling the lens frame member to be movable in the first direction independently of the second driving means. The first and second coupling members are movably arranged about the outer periphery of the lens frame member for holding the shake preventing optical system, and the first and second driving means are arranged about the outer periphery of the lens frame member for holding the shake preventing optical system at positions different from those of the first and second coupling means in the circumferential direction so as to have an orthogonal positional relationship with the optical axis of the shake preventing optical system.

According to the present invention, first and second motors are used as the first and second driving means, and respectively have first and second conversion means for converting rotations of the corresponding output shafts into linear motions in the first and second directions. In addition, the output shafts of the first and second motors are arranged to be parallel to the first and second directions, respectively.

According to the present invention, the shake preventing optical system can be moved in the first and second directions through its lens frame member by the driving forces from the first and second driving means which are controlled in a desired state by the shake detection means and the control means. Therefore, the shake preventing optical system can be arbitrarily driven in a synthesized direction, thus preventing a shake.

Furthermore, according to the present invention, the first and second driving means, and the first and second coupling members can be built in around the outer circumferential portion of the lens frame member for holding the shake preventing optical system as a desired unit. Therefore, the Space factor can be improved, and the above-mentioned means can be arranged adjacent to another complicated mechanism unit.

A lens driving apparatus according to a still further aspect of the present invention comprises a lens, an integrated frame member which holds the lens, and and first and second driven portions, a support member for supporting the support portion of the frame member, a first driving means for driving the frame member along a first path by a first engaging portion engaged with the first driven portion of the frame member, and a second driving means for driving the frame member along a second path different from the first path by a second engaging portion engaged with the second driven portion of the frame member. The frame member is driven along the first direction using a supporting portion of the support member and the second engaging portion of the second driving means as guides, and is driven along the second path using the supporting portion of the support member and the first engaging portion of the first driving means as guides.

In this case, each of the first and second driving means preferably includes a cam mechanism or a feed screw mechanism.

In a preferred form of the frame member, the first and second driven portions are arranged at positions symmetrical with the respect to a line passing through the support portion and perpendicular to the optical axis.

Furthermore, in the frame member, the first and second driven portions may be arranged along a line passing through the optical axis of the lens.

Also in the frame member, one of the first and second driven portions and the support portion may be arranged along a line passing through the optical axis of the lens.

According to the present invention, the lens driving apparatus is constituted by the frame member, the first and second driving means, and the support member, and has a simple structure.

BRIEF DESCRIPTION OF THE DRAWINGS

FIG. 6 is a flow chart showing the operation of another embodiment of a shake correction apparatus according to the present invention;

DETAILED DESCRIPTION OF THE PREFERRED EMBODIMENTS

The preferred embodiments of the present invention will be described in detail hereinafter with reference to the accompanying drawings.

Figure 1:
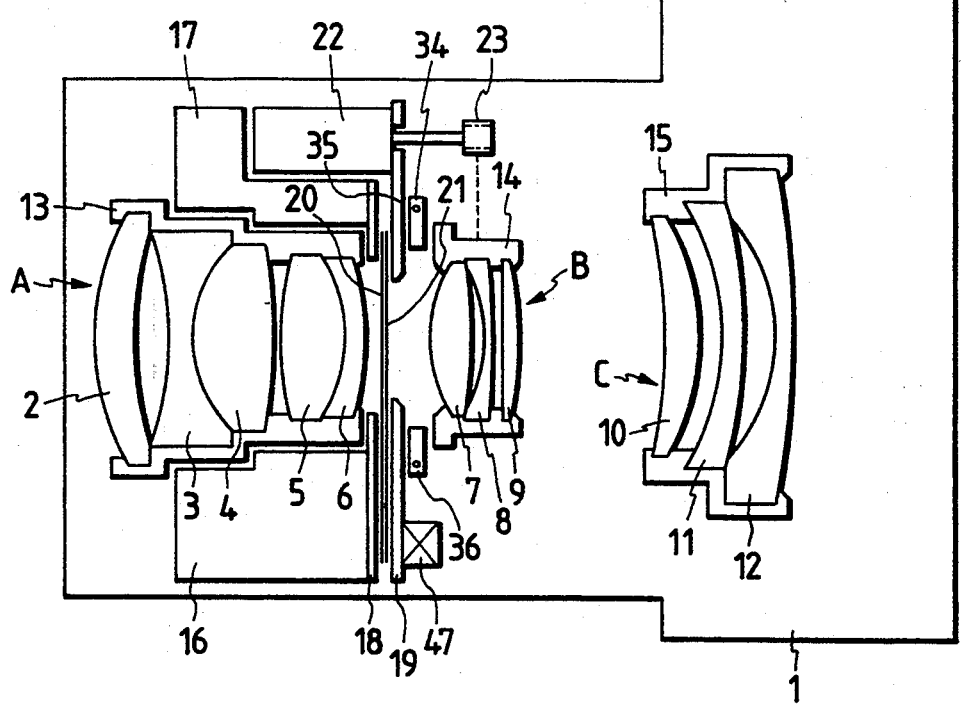
FIG. 1 is a longitudinal sectional view showing the structure (wide-end state) of a camera with a shake correction apparatus according to an embodiment of the present invention.
Figure 2:
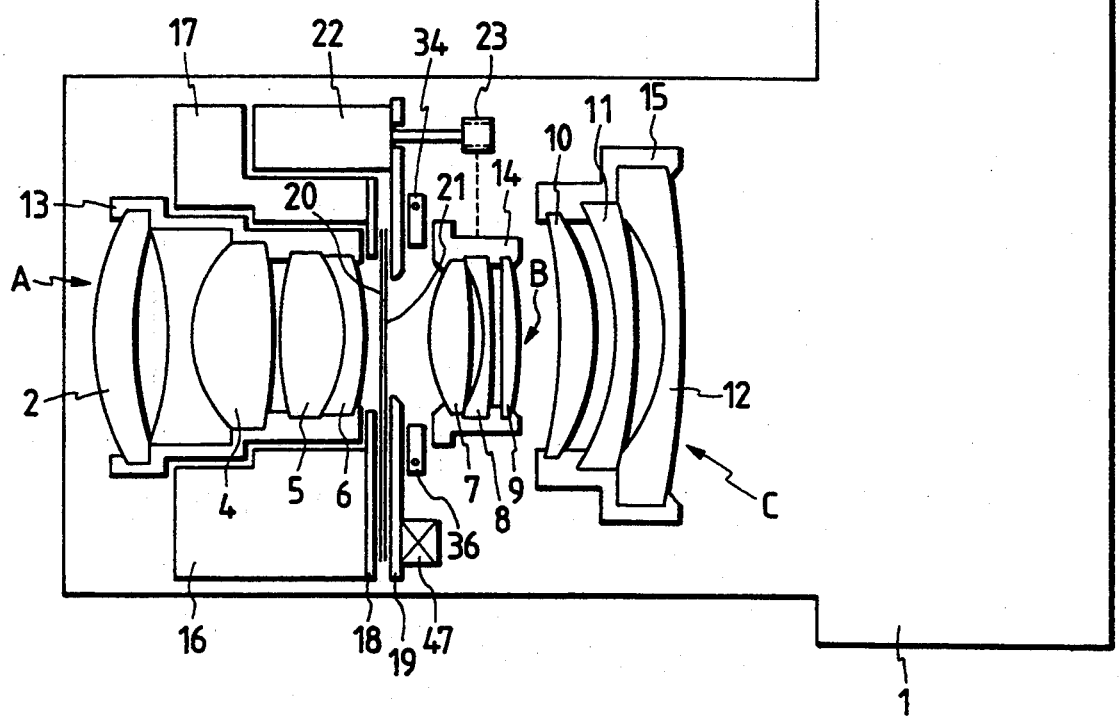
FIG. 2 is a longitudinal sectional view showing the structure (telephoto-end state) of the camera with the shake correction apparatus according to the embodiment of the present invention.
Figure 3:
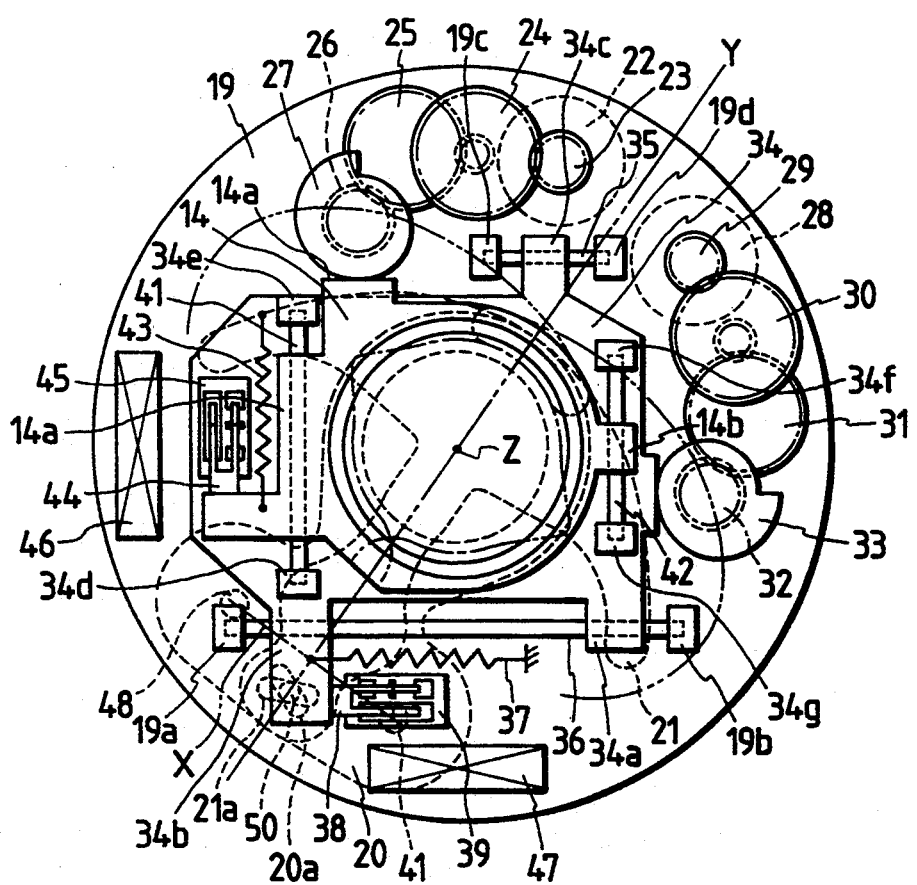
FIG. 3 is a plan view showing a driving mechanism unit of a shake correction lens of the camera according to the embodiment shown in FIG. 1.

FIGS. 1 and 2 are longitudinal sectional views showing an embodiment of a camera with a shake preventing apparatus according to the present invention, and FIG. 3 is a plan view showing a driving mechanism unit of a shake correction lens of the camera according to the embodiment.

As shown in FIGS. 1 and 2, a camera 1 of this embodiment is a lens shutter camera having a 3-group (convex, convex, and concave) zoom lens. FIG. 1 shows a wide-end state, and FIG. 2 shows a telephoto-end state.

A first lens group A is constituted by lenses 2, 3, 4, 5, and 6, and is extended in the optical axis direction to perform a focusing operation.

A second lens group B is constituted by lenses 7, 8, and 9. The second lens group B serves as a shake correction lens, which can be decentered within a plane perpendicular to the optical axis, i.e., in a direction parallel to the film surface, and can shift an object image on the film surface while maintaining good optical characteristics when it is decentered.

A third lens group C is constituted by lenses 10, 11, and 12.

Sectors 20 and 21 also serving as aperture blades are arranged between bases 18 and 19. A shutter driving control mechanism unit 16 and a focusing driving control mechanism unit 17 are mounted on the base 18.

The base 19 is fixed integrally with the base 18, and actuators 22 and 28 (the actuator 28 is not shown in FIG. 1, see FIG. 3) for decentering the second lens group B, and a shake correction lens driving mechanism including decentering bases 14 and 34, and the like (to be described later) are mounted on the base 19.

Note that the actuator 22 may be mounted on the base 18. It is preferable that at least a portion of the actuator 22 is arranged in front (at the object side) of the bases 18 and 19.

Since the decentering driving mechanism is mounted on the base 19 in this manner, the structure can be simplified as compared to a case wherein the mechanism is mounted on another portion. Since the actuators 22 and 28 are arranged at positions where a light beam is most focused, the diameter of a lens barrel can be decreased.

The decentering base 34 is a base for decentering the second lens group B, and the second lens group B is decentered along guide rods 35 and 36 fixed to the base 19.

The decentering base 14 is a base for decentering the second lens group B in a direction perpendicular to the decentering base 34, and the second lens group B is decentered along guide rods 41 and 42 (see FIG. 3) fixed to the decentering base 34.

A vibration sensor 46 (see FIG. 3) and another vibration sensor 47 for detecting a vibration of the camera are mounted on the base 19.

FIG. 3 is a plan view showing a driving mechanism unit of the shake correction lens used in the camera of this embodiment. FIG. 3 shows a state before an exposure operation. In this state, the decentering amount of the second lens group B is zero, and the shutter is closed.

It is known that an image blur is mostly attributed to the rotational vibration component of vibration components of the camera, and vibration components caused by a shift of the camera can be almost ignored.

The vibration sensors 46 and 47 are sensors for detecting the rotational vibration components of the camera, and can comprise, e.g., angular speed sensors. The vibration sensors 46 and 47 are fixed on the base 19 in orthogonal directions of their longitudinal axes, and detect angular speeds about their longitudinal axes.

The guide rods 35 and 36 are fixed on the base 19 by projections 19c, 19d, 19a, and 19b on the base 19 to be perpendicular to the longitudinal axis of the vibration sensor 46.

The decentering base 34 is movable in a direction perpendicular to the longitudinal direction of the vibration sensor 46 with respect to the base 19 since the guide rods 36 and 35 are slidably fitted in through holes of support portions 34a, 34b, and 34c.

The guide rods 41 and 42 are fixed on the decentering base 34 by projections 34d, 34e, 34f, and 34g on the decentering base 34 to be perpendicular to the longitudinal direction of the vibration sensor 47.

The decentering base 14 is movable on the decentering base 34 in a direction perpendicular to the longitudinal direction of the vibration sensor 47 since the guide rods 41 and 42 are slidably fitted in through holes of support portions 14a and 14b.

A cam 33 is a cam for driving the base 34, and contacts the decentering base 34 by the biasing force of a tensile spring 37 extended between the decentering base 34 and the base 19. The cam 33 is gear-coupled to the actuator 28 through a reduction gear train consisting of reduction gears 29, 30, 31, and 32. Therefore, the cam 33 is rotated upon rotation of the actuator 28, and the base 34 is moved along the guide rods 35 and 36 upon rotation of the cam 33.

A cam 27 is a cam for driving the base 14, and contacts the decentering base 14 by the biasing force of a tensile spring 43 extended between the decentering bases 14 and 34. The cam 27 is gear-coupled to the actuator 22 through a reduction gear train consisting of reduction gears 23, 24, 25, and 26. Therefore, the cam 27 is rotated upon rotation of the actuator 22, and the base 14 is moved along the guide rods 41 and 42 upon rotation of the cam 27.

Even when the decentering base 34 is driven by the cam 33, a contact surface 14a of the decentering base 14 with the cam 27 is parallel to the guide rods 35 and 36, and has a length larger than the moving amount of the decentering base 34. Therefore, the lift amount of the cam 27 can be precisely transmitted to the decentering base 14 independently of the movement of the decentering base 34.

The position of the shake correction lens in a direction parallel to the guide rod 36 is detected by a switch constituted by a brush 38 fixed on the decentering base 34, and a printed board 39 on the base 19. This detection is performed at three positions, i.e., a zero decentering position, and shift limit positions at the two ends.

The position of the shake correction lens in a direction parallel to the guide rod 41 is detected by a switch constituted by a brush 44 fixed on the decentering base 14, and a printed board 45 on the decentering base 34. This detection is performed at three positions, i.e., a zero decentering position, and shift limit positions at the two ends.

Since the decentering bases 14 and 34 are guided on the base 19, and the vibration sensors 46 and 47 are fixed to the base 19, the precision of the vibration detection directions of the vibration sensors 46 and 47, and the driving directions of the decentering circuit boards 14 and 34 can be improved.

The aperture blades (sectors) 20 and 21 are arranged between the bases 18 and 19 so that their positions are regulated in the optical axis direction. The aperture blades 20 and 21 are pivotally supported by pins 48 and 49 fixed on the base 18. A drive pin 50 driven by the shutter mechanism is inserted in cam holes 20a and 21a formed in the aperture blades 20 and 21.

The state of the aperture blades 20 and 21 indicated by a broken line and a solid line represents a shutter closed state, and the state of the aperture blades 20 and 21 indicated by an alternate long and short dashed line indicates a shutter open state.

The actuators 22 and 28 are arranged to be substantially symmetrical about an axis Y (alternate long and two short dashed line) passing the optical axis Z (a point in FIG. 3) perpendicular to a line X (alternate long and two short dashed line) connecting the pins 48 and 49 as the centers of rotation of the aperture blades 20 and 21. In this arrangement, the actuators are arranged outside the moving path of the aperture blades and at positions closest to the optical axis as much as possible, and this arrangement contributes to a compact structure of the camera.

The operation of the camera with the above arrangement will be described below.

When the angular speeds of the camera are detected by the angular speed sensors 46 and 47, the detection signals are supplied to a shake correction calculation circuit (not shown) through an amplifier (not shown). The shake correction calculation circuit calculates the driving direction and speed of the shake correction lens so as to prevent an object image on the film surface formed by the photographing lens from being blurred.

The actuators 22 and 28 are driven according to the calculation output of the shake correction calculation circuit through an actuator control circuit, and the shake correction lens is shifted. Note that the actuator 28 is driven based on the output from the angular speed sensor 46, and the actuator 22 is driven based on the output from the angular speed sensor 47.

An operation for driving the shake correction lens to the zero decentering position by the actuators 22 and 28 is performed after the end of the exposure operation.

When a shift limit position switch is turned on, and the shift limit position is detected, the actuators are stopped, and are restarted when shift signals in the opposing direction are input.

As described above, according to the present invention, since the driving mechanism and the actuators for the shake correction lens are arranged on a base with a shutter mechanism unit or a base arranged integrally with the base the structure of the lens barrel can be prevented from being complicated.

Since the actuators for the shake correction lens are arranged near the aperture stop where a light beam is most focused, the diameter of the lens barrel can be prevented from being increased.

Another embodiment of the present invention will be described in detail below.

Figure 4:
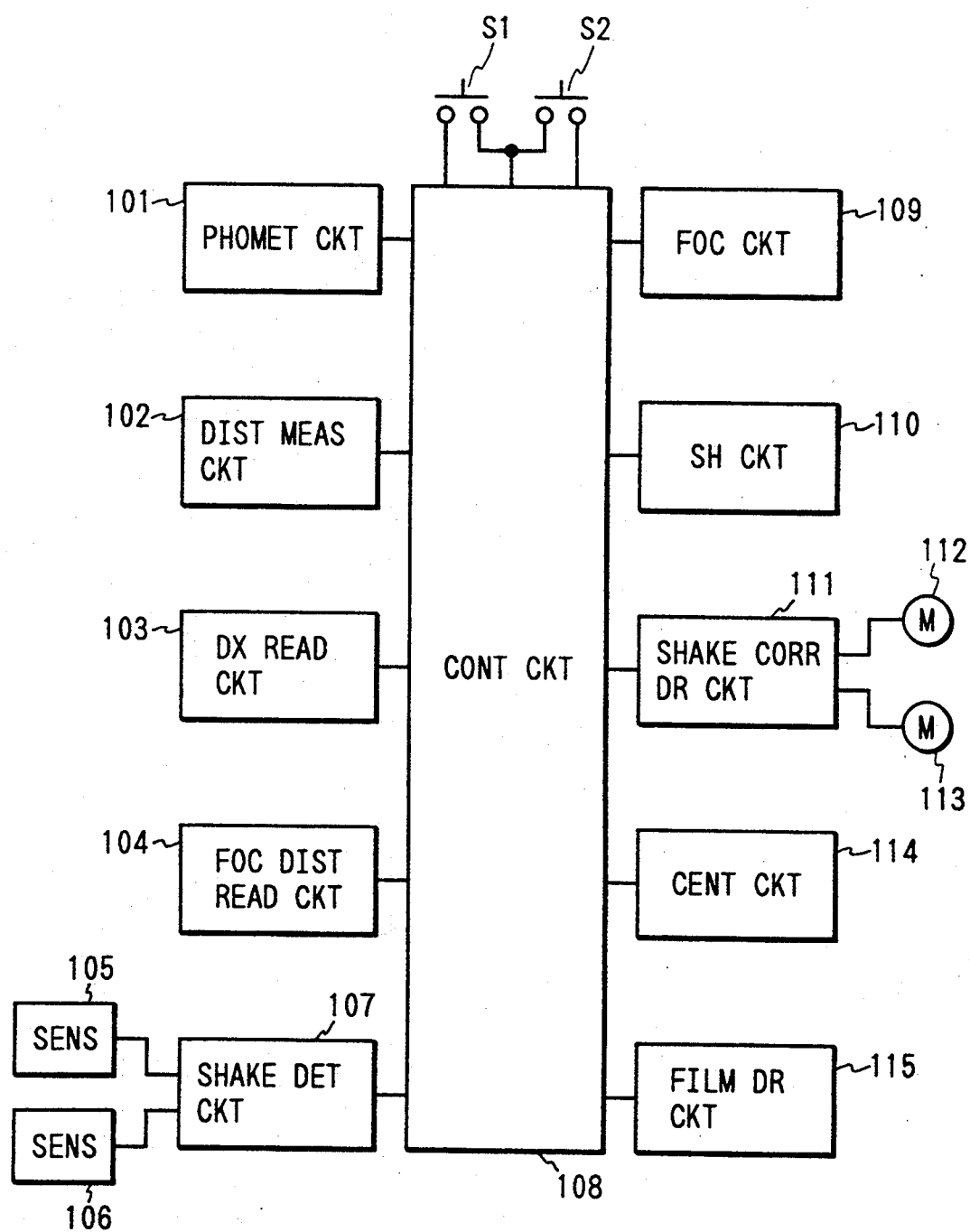
FIG. 4 is a block diagram showing an embodiment of the shake correction apparatus according to the present invention.
Figure 8:
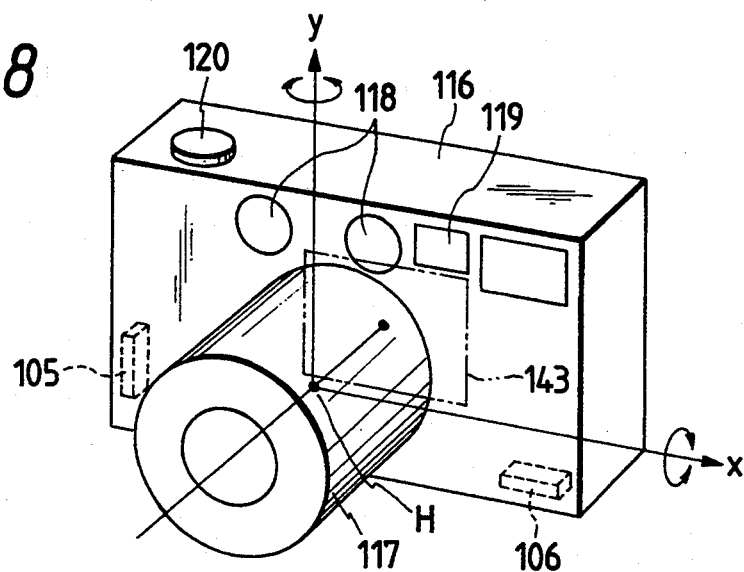
FIG. 8 is a perspective view showing a camera with a shake correction apparatus.

FIG. 4 is a block diagram showing an embodiment of a shake correction apparatus according to the present invention. The shake correction apparatus of this embodiment is assembled in a camera similar to that shown in FIG. 8, and in the following description, the same reference numerals denote portions having the same functions.

The shake correction apparatus comprises a control circuit 108, and a photometry circuit 101, a distance-measurement circuit 102, a DX read circuit 103, a focal length read circuit 104, a shake detection circuit 107, a focusing circuit 109, a shutter circuit 110, a shake correction driving circuit 111, a centering circuit 114, a film driving circuit 115, and the like, which are connected to the control circuit 108.

The control circuit 108 is also connected to half- and full-stroke switches S1 and S2. The half-stroke switch S1 is turned on when a release button 120 is depressed to its half-stroke position, and the full-stroke switch S2 is turned on when the release button 120 is depressed to its full-stroke position.

The shake detection circuit 107 is connected to angular speed sensors 105 and 106. The shake correction driving circuit 111 is connected to motors 112 and 113. The motors 112 and 113 are motors for shifting a shake correction lens L2 by driving a lens driving mechanism (to be described later).

When the shake detection circuit 107 detects a rotation of the camera according to signals from the angular speed sensors 105 and 106, the control circuit 108 performs shake correction processing, and drives the motors 112 and 113 through the shake correction driving circuit 111 according to the processing result. Thus, a shake is corrected by shifting the shake correction lens L2.

Figure 5:
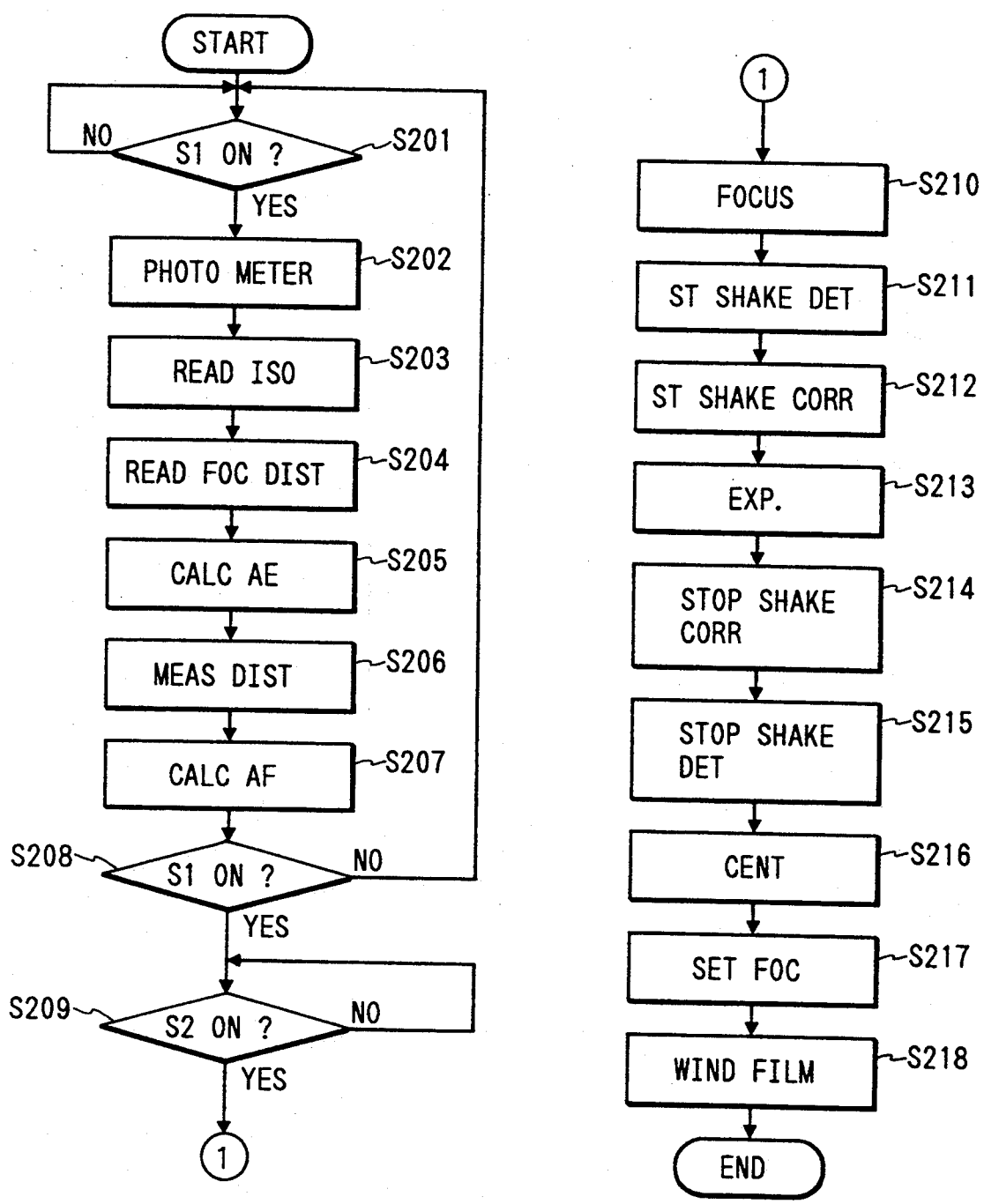
FIG. 5 is a flow chart showing the operation of the shake correction apparatus according to the embodiment shown in FIG. 4.

FIG. 5 is a flow chart showing the operation of the embodiment of the shake correction apparatus according to the present invention.

In this embodiment, photometry and distance-measurement operations are started when the half-stroke switch S1 is turned on. When the full-stroke switch S2 is turned on, a focusing operation is performed, and a shake detection operation is then started. After a shake correction operation is started, an exposure operation is performed while the shake correction operation is being executed.

More specifically, when the half-stroke switch S1 is turned on (S201), a photometry operation is performed by the photometry circuit 101 (S202), the ISO sensitivity is read by the DX read circuit 103 (S203), and the focal length is read by the focal length read circuit 104 (S204). Thereafter, the control circuit 108 performs an AE calculation (S205).

The distance-measurement circuit 102 then performs a distance-measurement operation (S206), and the control circuit 108 performs an AF calculation (S207).

Thereafter, if it is determined in step S208 that the half-stroke switch S1 is ON, the flow advances to step S209; otherwise, the flow returns to step S201.

It is checked in step S209 if the full-stroke switch S2 is ON. If Y (YES) in step S209, the flow advances to step S210, and the focusing circuit 109 performs a focusing operation.

Upon completion of the focusing operation (S210), the shake detection circuit 107 starts a shake detection operation on the basis of the detection signals from the angular speed sensors 105 and 106 (S211).

Based on this detection result, a mechanism shown in FIG. 10 (to be described later) starts a shake correction operation (S212), and thereafter, an exposure operation is performed (S213). Upon completion of the exposure operation, the shake correction operation is stopped (S214), and then, the shake detection operation is stopped (S215).

Figure 9A:
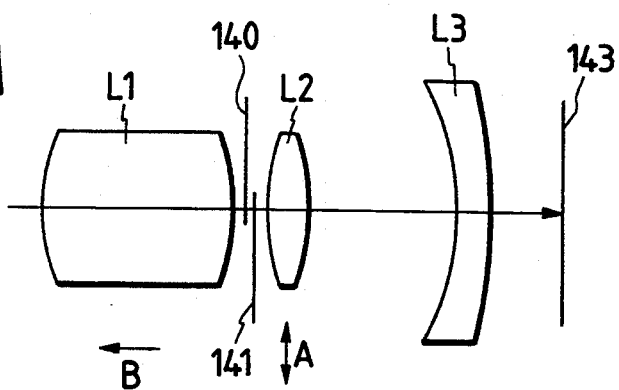
FIGS. 9A and 9B are charts showing an optical system of a photographing lens of the camera shown in FIG. 8.
Figure 9B:
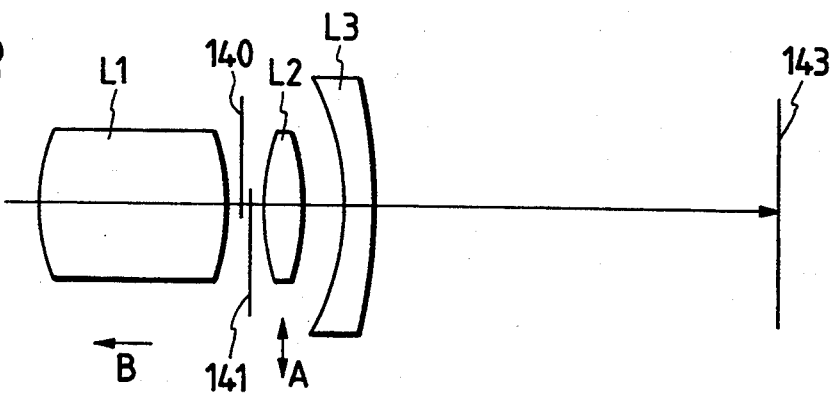

In this manner, after the shake correction operation is started, the exposure operation is performed while executing the shake correction operation. After the exposure operation is completed, the shake correction and detection operations are stopped. Note that the shake detection and correction methods have already been described above with reference to FIG. 8 and FIGS. 9A and 9B.

After the shake detection operation is stopped, the shifted shake correction lens L2 (see FIGS. 9A and 9B) is returned to the central position by a mechanism shown in FIG. 11 (to be described later) (S216), and then, a focusing lens (see FIGS. 9A and 9B) is reset (S217). Thereafter, the film driving circuit 115 (S218) winds a film, thus ending a series of operations.

As described above, after the focusing operation is completed, the shake detection operation is performed, and the shake correction operation is then executed. Thus, the detected shake amount can coincide with the correction amount. This will be described below with reference to FIG. 7B.

Figure 7A:
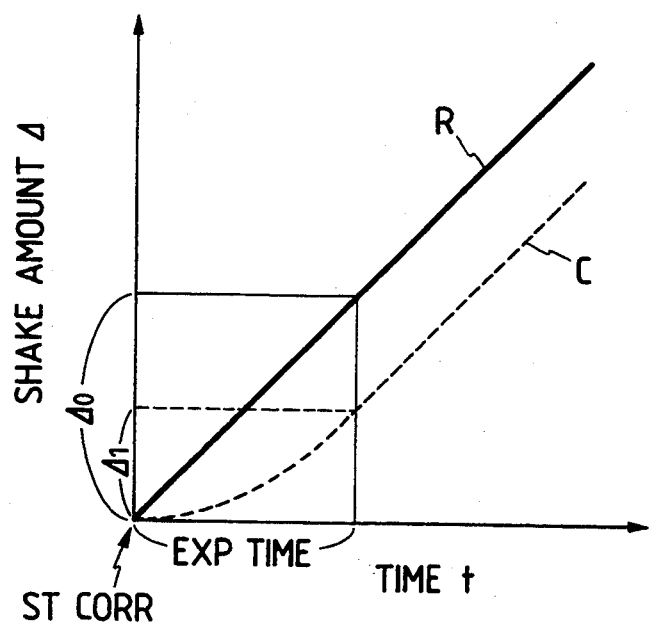
FIGS. 7A and 7B are graphs showing the relationship among the shake amount, shake correction amount, and time.
Figure 7B:
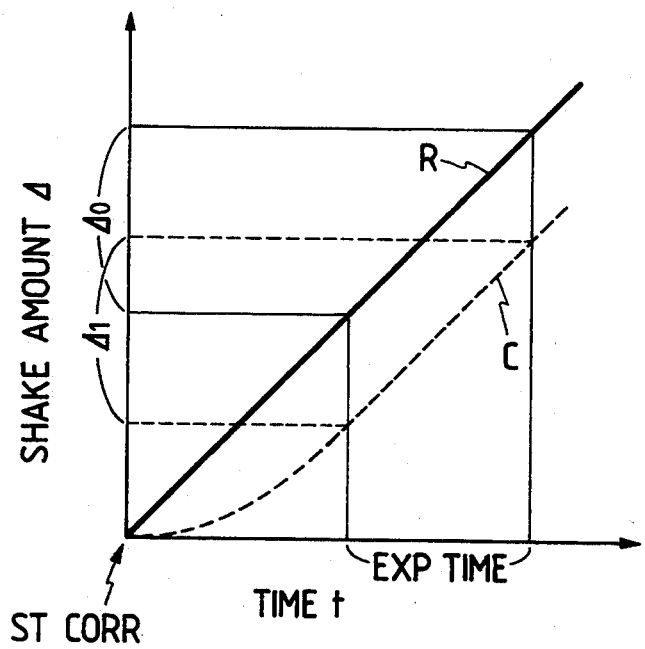

FIG. 7B is a graph showing the relationship among the time, shake amount, and correction amount when the shake correction operation is started after the end of the focusing operation and before the end of the exposure operation.

In FIG. 7B, a solid line represents the detected shake amount, and a broken curve represents the correction amount. In this embodiment, since the driving operation of the shake correction lens L2 is started before the exposure operation is started, the early stage of the correction operation with an insufficient correction speed has already ended. Therefore, a shake amount Δ0 and a correction amount Δ1 can coincide with each other, and a precise shake correction operation can be realized.

FIG. 6 is a flow chart showing an operation of another embodiment of a shake correction apparatus according to the present invention. Since the arrangement of this embodiment can be the same as that shown in FIG. 4, a detailed description thereof will be omitted, and a difference from the flow chart shown in FIG. 5 will be mainly described below.

FIG. 6 is a flow chart showing another control of the circuit shown in FIG. 4.

When the half-stroke switch S1 is turned on (S301), the photometry step (S302) to the AF calculation step (S307) are performed in the same manner as described above. Thereafter, the focusing step (S308) is immediately executed. When the full-stroke switch S2 is turned on, a shake correction operation is started (S321), and the exposure step (S314) is executed while executing a series of shake correction operations (S312, S313, S315, S316, and the like).

In this embodiment, the focusing step (S308) is executed when the half-stroke switch S1 is turned on (S301). When the half-stroke switch S1 is turned off (S309) before the full-stroke switch S2 is turned on (S311), the focusing lens is reset (S310).

This is to shorten a time lag from when the full-stroke switch S2 is turned on (S311) until the exposure step (S314) is executed. In addition, the focusing operation (S308) can be confirmed before the full-stroke switch S2 is turned on (S311).

When the half-stroke switch S1 is turned off (S309) after the focusing operation (S308) and before the full-stroke switch S2 is turned on (S311), it is determined that a photographing operation is interrupted, and the focusing lens is reset (S310). When the half-stroke switch S1 is turned on again, the focusing operation is performed again (S308).

Figure 10:
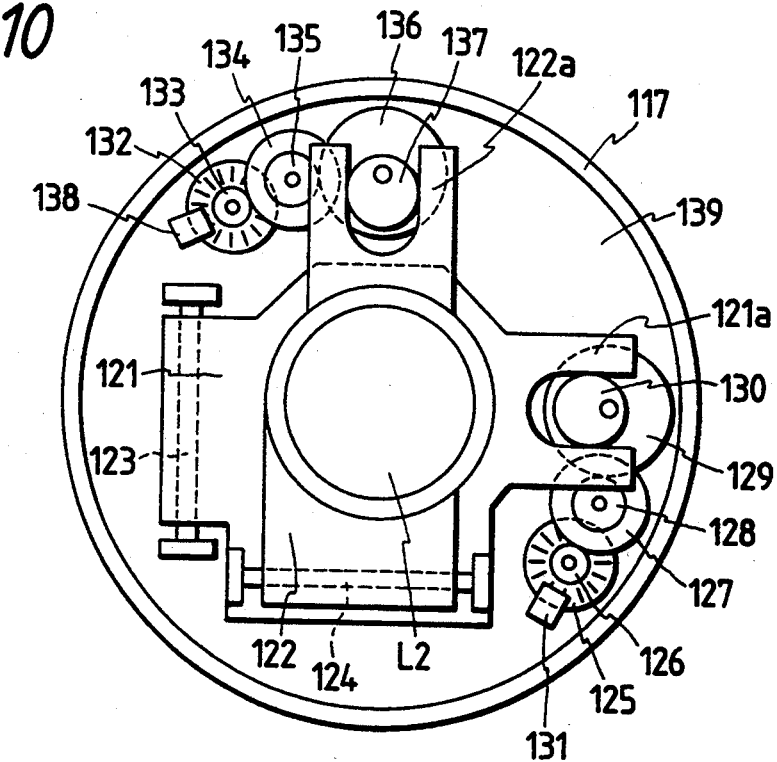
FIG. 10 is a view showing a correction lens driving mechanism of the shake correction apparatus according to the embodiment shown in FIG. 4.

FIG. 10 shows a driving mechanism of the shake correction lens used in the shake correction apparatus according to the embodiment shown in FIG. 4.

In a lens barrel 117, a base 139 constituting a driving mechanism of the shake correction lens L2 is arranged. A guide rod 123 is fixed on the base 139, and a lens driving plate 121 is fitted on the guide rod 123 to be movable in the axial direction of the guide rod 123.

A guide rod 124 is fixed to the lens driving plate 121, and a lens mounting plate 122 is fitted on the guide rod 124 to be movable in the axial direction of the guide rod 124.

The shake correction lens L2 is two-dimensionally movable by the lens driving plate 121 and the lens mounting plate 122 since it is mounted on the lens mounting plate 122.

The lens driving plate 121 and the lens mounting plate 122 are respectively provided with arms 121a and 122a, and cams 130 and 137 slidably contact the U-shaped portions of the arms 121a and 122a.

The cam 130 receives the driving force of the motor 112 through gears 126, 127, 128, and 129, and the cam 137 receives the driving force of the motor 113 through gears 133, 134, 135, and 136.

Encoder disks 125 and 132 are respectively fixed to the shafts of the motors 112 and 113. Photointerrupters 131 and 138 for detecting the rotational amounts and rotational speeds of the encoder disks 125 and 132 are arranged adjacent to the encoder disks 125 and 132.

The operation of the driving mechanism of the correction lens L2 will be described below.

The motors 112 and 113 are driven on the basis of the shake detection result described with reference to FIG. 5 or 6, and the driving forces of these motors are transmitted to the cams 130 and 137 through the gears 126 to 129 and the gears 133 to 136. Upon rotation of the cam 130, the correction lens L2 is shifted in the vertical direction, and upon rotation of the cam 137, the correction lens L2 is shifted in the horizontal direction, thus correcting a shake.

These shift amounts are detected by the photointerrupters 131 and 138, and are fed back to the control circuit 108.

Figure 11:
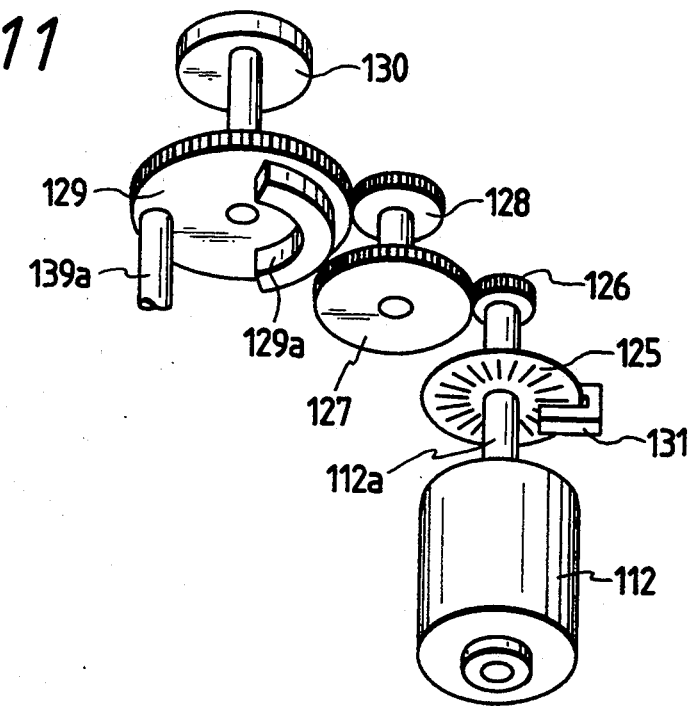
FIG. 11 is a view showing a correction lens centering mechanism of the shake correction apparatus according to the embodiment shown in FIG. 4.

FIG. 11 is a view showing a method of centering the correction lens in the driving mechanism of the correction lens. In the following description, the system of the motor 112 will be exemplified. However, the same applies to the system of the motor 113.

In FIG. 11, the rotational angle of the cam 130 is defined to a predetermined range by a projection 129a projecting from the lower portion of the gear 129 fixed to the shaft of the cam 130, and a pin 139a of the base 139. It is set such that the shake correction lens is located at the shift limit when one circumferential end of the projection 129a contacts the pin 139a. More specifically, the shift amount of the shake correction lens L2 is limited, and the central position of the shift amount is defined as the central position of the shake correction lens L2. Note that FIG. 11 illustrates a state wherein the shake correction lens L2 is located at the central position.

After the shake correction operation is stopped, the motor 112 is rotated until one end of the projection 129a contacts the pin 139a of the base 139, and is then rotated in the reverse direction up to the central position of the shift amount. Thus, the shake correction lens L2 can be returned to the central position (S216 or S317 in FIG. 5 or 6).

As described in detail above, according to the present invention, the shake correction operation can be performed with high precision without increasing power consumption and the load on the control circuit.

FIGS. 12 to 17 show another embodiment of a shake preventing apparatus according to the present invention. The outline of an arrangement of a camera having a photographing lens system with a lens shutter, which camera can suitably adopt the present invention, will be briefly described below with reference to FIG. 17.

In a camera 201, a photographing lens system 202 is constituted as a zoom lens including a first lens group 204 constituted by three lenses 204a, 204b, and 204c held by a lens frame 203, a second lens group 209 constituted by a total of seven lenses, i.e., having front and rear lens groups 207 and 208, which are respectively constituted by three lenses 207a, 207b, and 207c held by a lens frame 205, and four lenses 208a, 208b, 208c, and 208d held by a lens frame 206, and a third lens group 211 constituted by three lenses 211a, 211b, and 211c held by a lens frame 210.

Figure 17:
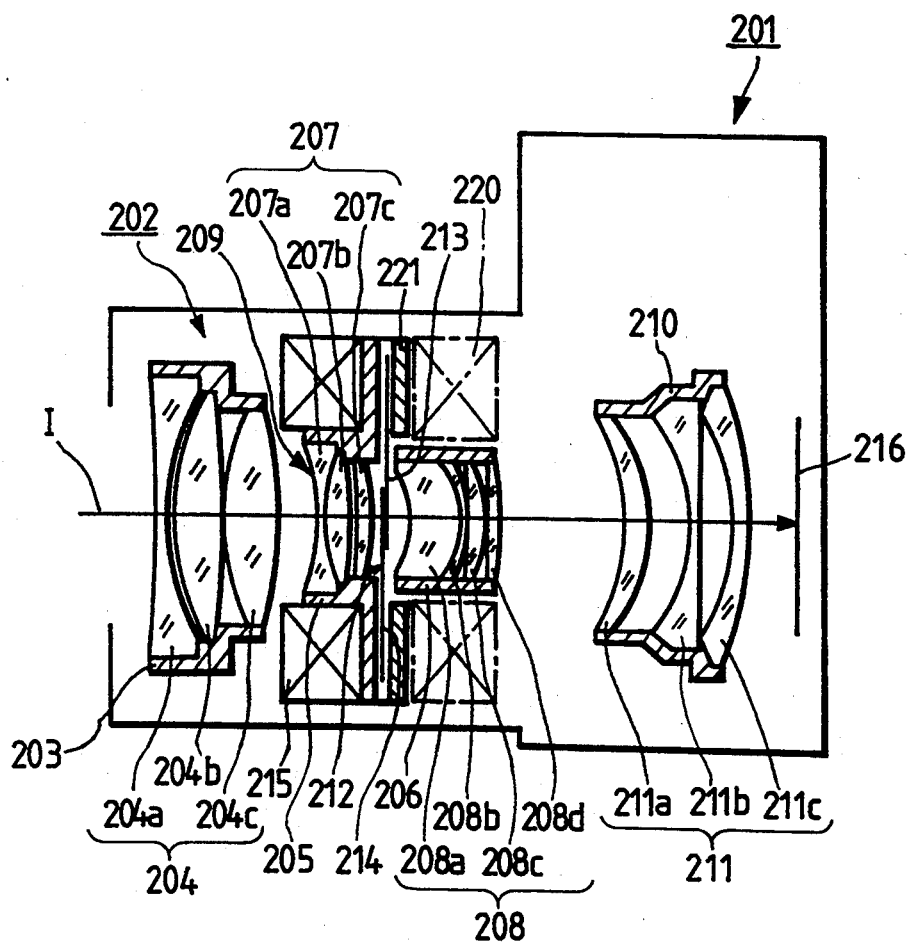
FIG. 17 is a schematic sectional view for explaining the outline of the arrangement of a lens shutter camera which can suitably adopt the shake preventing apparatus according to the present invention.

In FIG. 17, a lens shutter 212 is interposed between the front and rear lens groups 207 and 208 of the second lens group 209, and is constituted by shutter curtains 213 and 214, a driving unit 215 for driving these curtains, and the like. Note that the driving unit 215 is arranged on the outer circumferential surface of the lens frame 205 of the front lens group 207 in the second lens group 209, and the shutter curtains 213 and 214 are arranged immediately before the rear lens group 208, which serves as a shake preventing lens (to be described later).

Furthermore, in FIG. 17, an object image is formed on an imaging plane 216 as a film by the first, second, and third lens groups 204, 209, and 211 constituting the above-mentioned photographing lens system 202. The photographing lens system 202 has an optical axis I.

Figure 12:
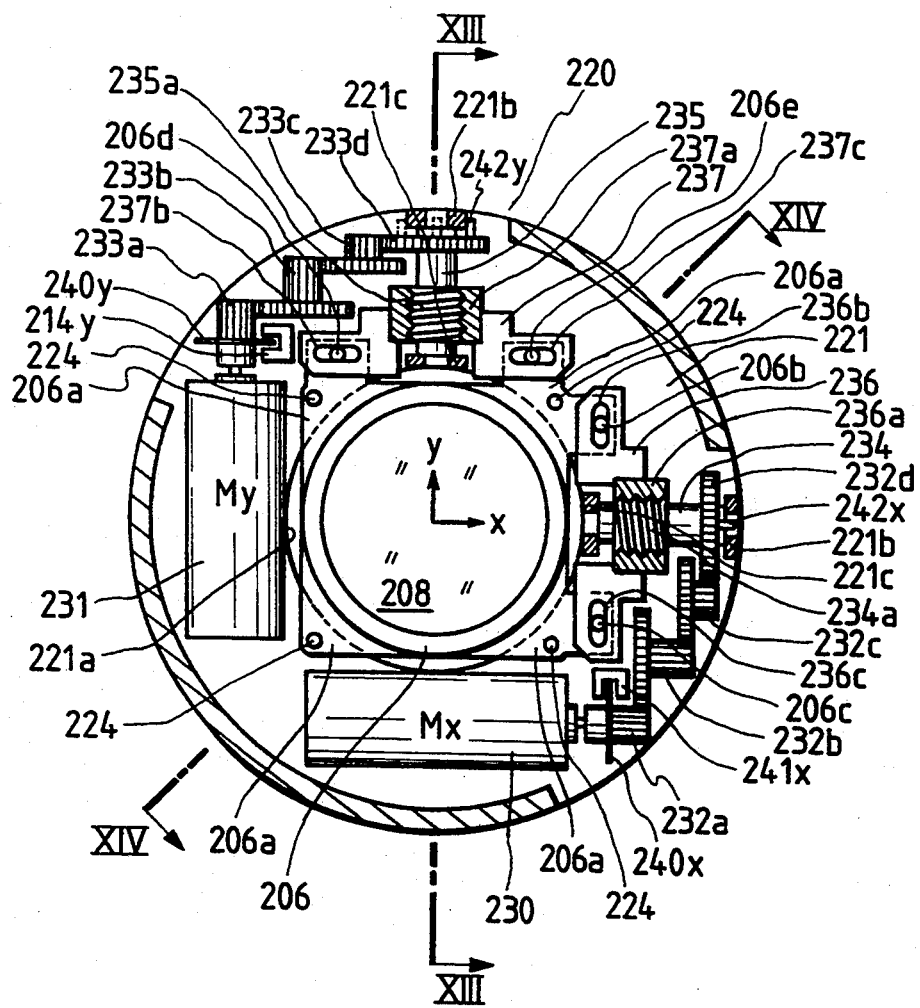
FIG. 12 is a sectional view showing an embodiment of a shake preventing apparatus according to the present invention, and especially showing a shake preventing mechanism unit of a lens barrel portion of a camera as main part of the apparatus.
Figure 13:
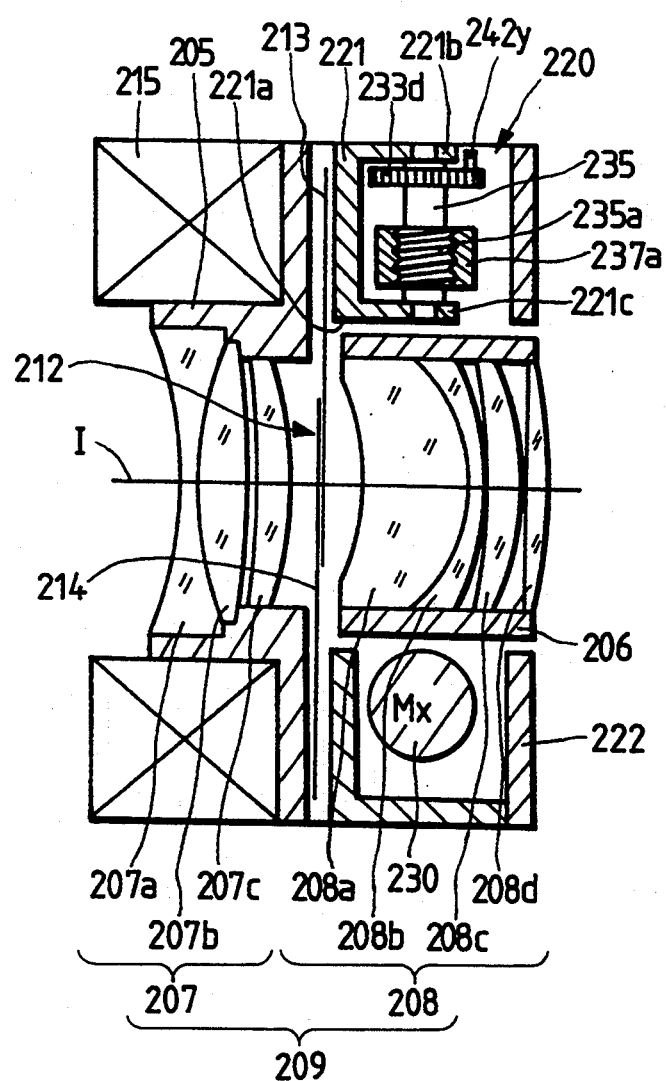
FIG. 13 is a sectional view taken along a line XIII—XIII in FIG. 12.
Figure 14:
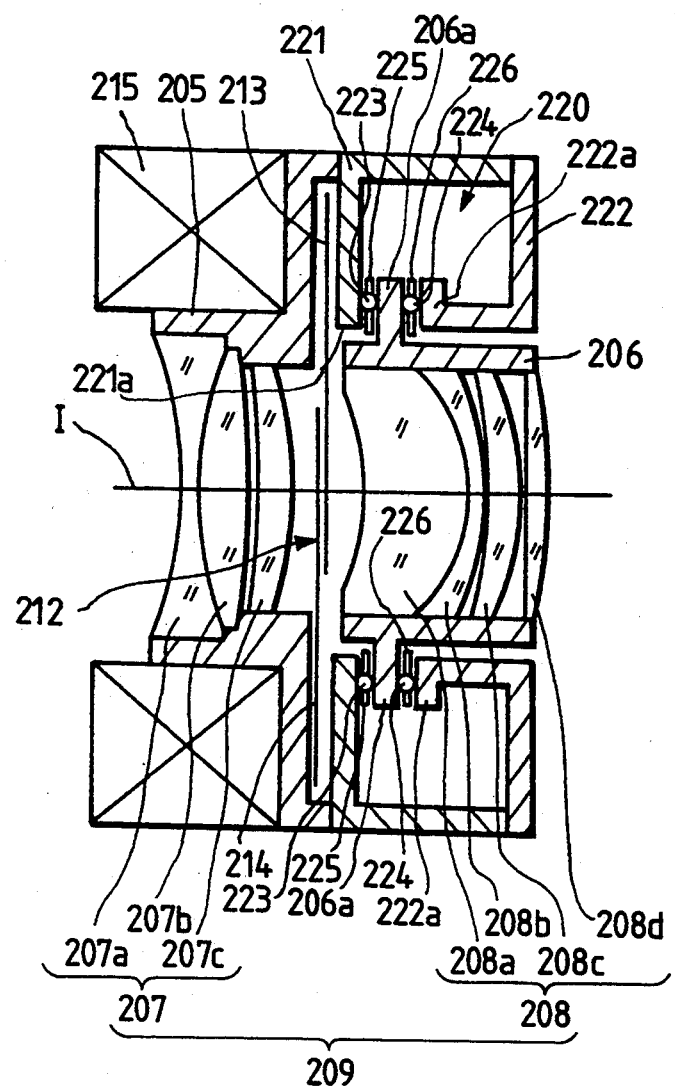
FIG. 14 is a sectional view taken along a line XIV—XIV in FIG. 12.

According to the present invention, in the photographing lens system 202 having the three lens groups 204, 209, and 211, in order to move an image formed on the imaging plane 216 according to an image blur state by shifting the rear lens group 208 of the second lens group 209 as the shake preventing lens in a direction perpendicular to the optical axis I, a shake preventing mechanism unit 220 shown in FIGS. 12 to 14 is used. As can be seen from FIGS. 13, 14, and 17, the shake preventing mechanism unit 220 is arranged by utilizing a base 221 on the side of the lens shutter 212 as a base member in a space on the outer circumferential surface side of the rear lens group 208 in the second lens group 209.

The shake preventing mechanism unit 220 will be described in detail below with reference to FIGS. 12 to 14. The rear lens group 208 (to be referred to as the shake preventing lens 208 hereinafter) in the second lens group 209 is fixed and held in the lens frame 206. The lens frame 206 is supported to be movable with less load in a direction perpendicular to the optical axis I inside an opening 221a of the base 221 in such a manner that a flange portion 206a formed on the outer circumferential surface of the lens frame 206 is clamped between the base 221 and four pressing portions 222a (only two of them are illustrated in FIG. 14) of a lid member 222 provided at the rear end side of the base 221 and forming an annular space therein through front and rear four balls each (hard balls) 223 and 224 (two each of them are not shown).

In FIG. 14, the balls 223 and 224 are respectively held by retainers 225 and 226. The retainers at only four positions are shown in FIG. 14, and those at the remaining positions are not shown.

DC motors 230 and 231 (indicated by Mx and My in FIG. 12) serve as driving means for moving the shake preventing lens 208 in the X- and Y-directions. Gear trains 232 and 233 for transmitting rotations respectively consist of gears 232a, 232b, 232c, and 232d, and gears 233a, 233b, 233c, and 233d for transmitting driving forces from the motors 230 and 231. The gear trains 232 and 233 respectively transmit rotations to first and second shafts 234 and 235. The first and second shafts 234 and 235 respectively extend in the X- and Y-directions, and are axially pivotally supported by bearing portions 221b and 221c provided to the base 221.

The above-mentioned motors 230 and 231 are fixed to the base 221 side. The gears 232a, 232b, and 232c, and the gears 233a, 233b, and 233c, which respectively constitute the gear trains 232 and 233, are pivotally fixed on the base 221, and the final gears 232d and 233d are arranged to be rotatable together with the shafts 234 and 235.

X- and Y-coupling members 236 and 237 respectively have female threaded portions 236a and 237a, which are threadably engaged with male threaded portions 234a and 235a of the shafts 234 and 235. The X-coupling member 236 is formed with elongated holes 236b and 236c parallel to the Y-direction, and these elongated holes 236b and 236c are engaged with bosses 206b and 206c provided to the flange portion 206a of the lens frame 206. Similarly, the Y-coupling member 237 is formed with elongated holes 237b and 237c parallel to the X-direction, and these elongated holes 237b and 237c are engaged with bosses 206d and 206e provided to the flange portion 206a of the lens frame 206.

Therefore, the above-mentioned shake preventing lens 208 is driven in the X-direction by the motor 230 through the X-coupling member 236, but is free in the Y-direction. With the similar mechanism, the shake preventing lens 208 is driven in the Y-direction by the motor 231 through the Y-coupling member 237, but is free in the X-direction.

In this manner, the shake preventing lens 208 is slidable in all directions within the opening 221a of the base 221.

Figure 15:
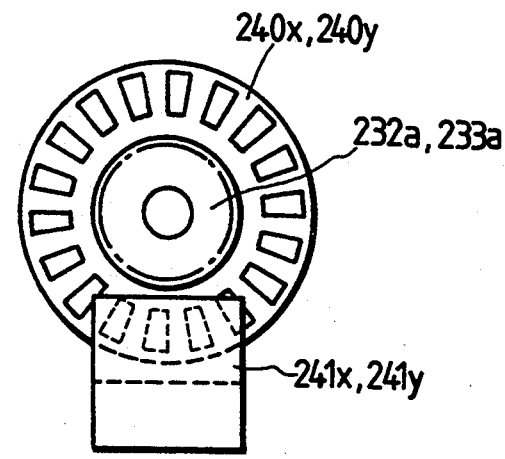
FIG. 15 is an enlarged view of main part for explaining a position detection means of a shake preventing lens.
Figure 16:
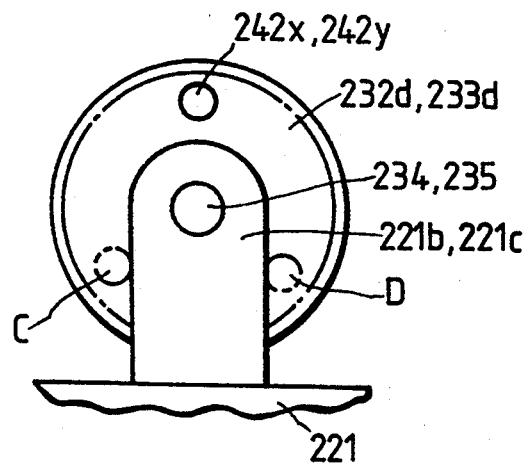
FIG. 16 is an enlarged view of main part for explaining a method of centering the shake preventing lens.

The position of the shake preventing lens 208 is detected by detecting the rotational angles of the X- and Y-motors 230 and 231 by disks 240x and 240y which are integrated with the gears 232a and 233a, and have a large number of holes formed at equal angular intervals in their peripheral edge portions, and photointerrupters 241x and 241y arranged at the base 221 side to clamp the peripheral edge portion of the disks 240x and 240y, as shown in FIGS. 12 and 15.

More specifically, each of the photointerrupters 241x and 241y detects the number of holes of the disk 240x or 240y as pulse signals, and counts it, thereby detecting the position.

The shake preventing lens 208 is centered as follows. More specifically, as can be easily understood from FIGS. 12 and 16, stopper pins 242x and 242y are arranged at eccentric positions of the gears 232d and 233d provided integrally on the shafts 234 and 235, and are brought into contact with two side edges of the bearing portions 221b and 221c of the base 221 at positions C and D in FIG. 16, thereby regulating the rotational angles of the gears 232d and 233d within the pivot range between the positions C and D. The center of the pivot range of the gears 232d and 233d is set to coincide with the central position of the shake preventing lens 208, thereby centering the shake preventing lens 208.

Since the rear lens group (shake preventing lens) 208 in the second lens group 209 (FIG. 17) is shifted in a direction perpendicular to the lens optical axis I by the shake preventing mechanism unit 220 with the above-mentioned arrangement, an image formed on the imaging plane 216 is shifted in a desired state, and consequently, an image blur can be prevented.

According to the shake preventing mechanism unit 220 described above, the DC motors 230 and 231 each having a relatively large volume can be arranged to have their longitudinal directions perpendicular to the optical axis I of the photographing lens system 202. As can be apparent from FIGS. 13 and 14, these DC motors 230 and 231 need not be set to project toward the lens shutter 212 or the third lens group 211, and can be assembled as a high-density compact unit on the outer circumferential surface side of the lens frame 206 of the shake preventing lens 208, thus providing advantages in terms of the structure, assembling, and the like.

Therefore, according to the above-mentioned shake preventing mechanism unit 220, the space of the lens shutter 212 or the interval between the second and third lens groups 209 and 211 is not disturbed. In addition, since the unit structure can be easily realized, easy assembling is allowed. For example, the unit 220 is very effectively arranged adjacent to an aperture stop mechanism in an exchangeable photographing lens.

Figure 18:
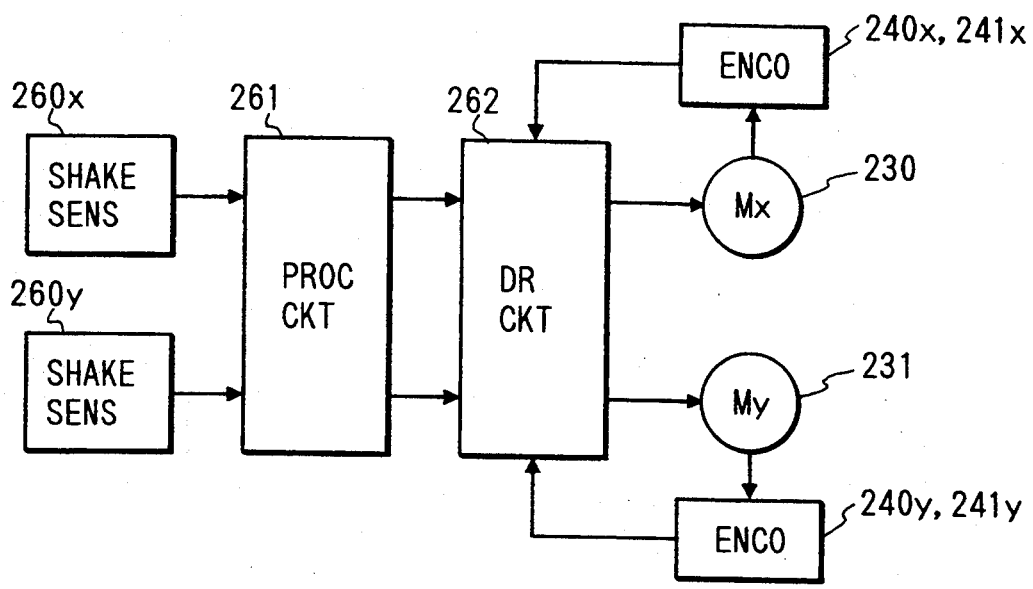
FIG. 18 is a block diagram for explaining a control means for controlling the shake preventing apparatus according to the present invention.

FIG. 18 is a block diagram showing a circuit for controlling the above-mentioned shake preventing mechanism unit 220. The circuit shown in FIG. 18 includes a shake sensor 260x comprising a known angular speed sensor for detecting an angular speed ωx in the vertical direction of the camera, and a shake sensor 260y comprising a known angular speed sensor for detecting an angular speed ωy in the horizontal direction of the camera. When these sensors 260x and 260y respectively detect the angular speeds ωx and ωy, a processing circuit 261 converts these angular speeds into image moving speeds on the corresponding imaging planes.

Figure 19:
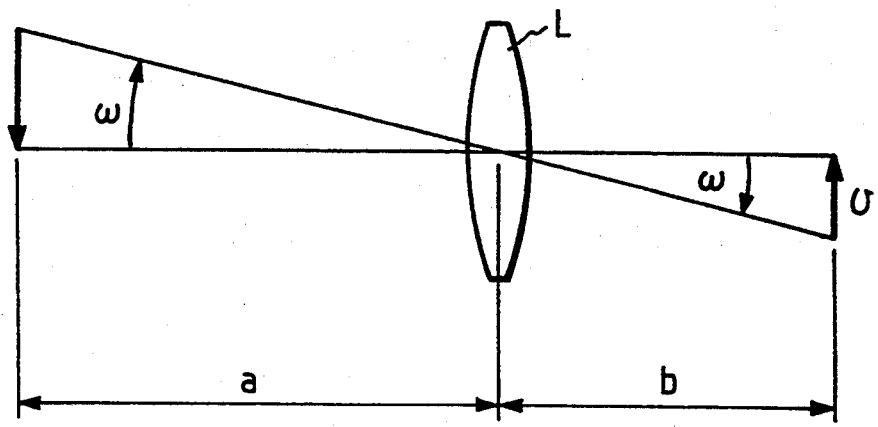
FIG. 19 is a schematic explanatory view of a shake preventing optical system for explaining control of the shake preventing apparatus by the control means in FIG. 18.

The conversion processing of the processing circuit 261 will be described below with reference to FIG. 19.

More specifically, if the distance between a lens L and an object is represented by a, the distance between the lens L and an imaging plane is represented by b, and the focal length of the lens L is represented by f, the following imaging formula is satisfied:

$$\frac{1}{a} + \frac{1}{b} = \frac{1}{f} \tag{1}$$

According to this relationship, if the optical axis I is inclined to I' at an angular speed ω, and a direction of an arrow is assumed to be the positive direction, a moving speed v of an image on the imaging plane can be expressed by:

$$v = \frac{af}{a-f} \omega \tag{2}$$

Therefore, the moving speed in the vertical direction of the camera is expressed by:

$$vx = \frac{af}{a-f} \omega x \tag{3}$$

The moving speed in the horizontal direction of the camera is expressed by:

$$vy = \frac{af}{a-f} \omega y \tag{4}$$

A driving circuit 262 controls the DC motors 230 and 231 to drive the shake preventing lens 208 so as to cancel the corresponding image moving speeds vx and vy.

The rotational angles and the rotational speeds of the DC motors 230 and 231 at that time are detected by an x-axis encoder (constituted by a disk 240x and a photointerrupter 241x), and a y-axis encoder (constituted by a disk 240y and a photointerrupter 241y), and are fed back to the driving circuit 262, thus executing predetermined driving control.

According to the above-mentioned arrangement, the first and second motors 230 and 231 are arranged in an annular space portion formed about the outer circumferential surface of the lens frame 206 of the shake preventing lens 208 at positions shifted, in the circumferential direction, from the first and second coupling members 236 and 237 movably arranged in this space portion, so that their longitudinal directions are perpendicular to the optical axis I. For this reason, the shake preventing mechanism unit 220 can be constituted as a unit although it has a simple mechanism unit structure, and it can be realized with high space factor and low cost.

In particular, such advantages can be further enhanced since the motors 230 and 231 are arranged to have their output shafts extending in the X- and Y-directions, respectively, and their rotational forces are converted into linear motions in the X- and Y-directions by the first and second shafts 234 and 235 and the first and second coupling members 236 and 237, which serve as first and second conversion means, through the gear trains 232 and 233.

Furthermore, in the above arrangement, the shake preventing mechanism unit 220 is constituted as a compact unit using a case member including the base 221 and the lid member 222 in the annular space portion formed on the outer circumferential surface side of the lens frame 206 of the shake preventing lens 208. Thus, the mechanism unit 220 can be effectively used in a portion where another complicated mechanism unit such as the lens shutter 12, or the like exemplified in FIG. 17 must be arranged adjacent to the unit 220.

Note that the present invention is not limited to the structure of the above-mentioned embodiment, and the shapes and structures of the respective units such as the shake preventing mechanism unit 220 constituting the shake preventing apparatus may be appropriately modified and changed.

Figure 20:
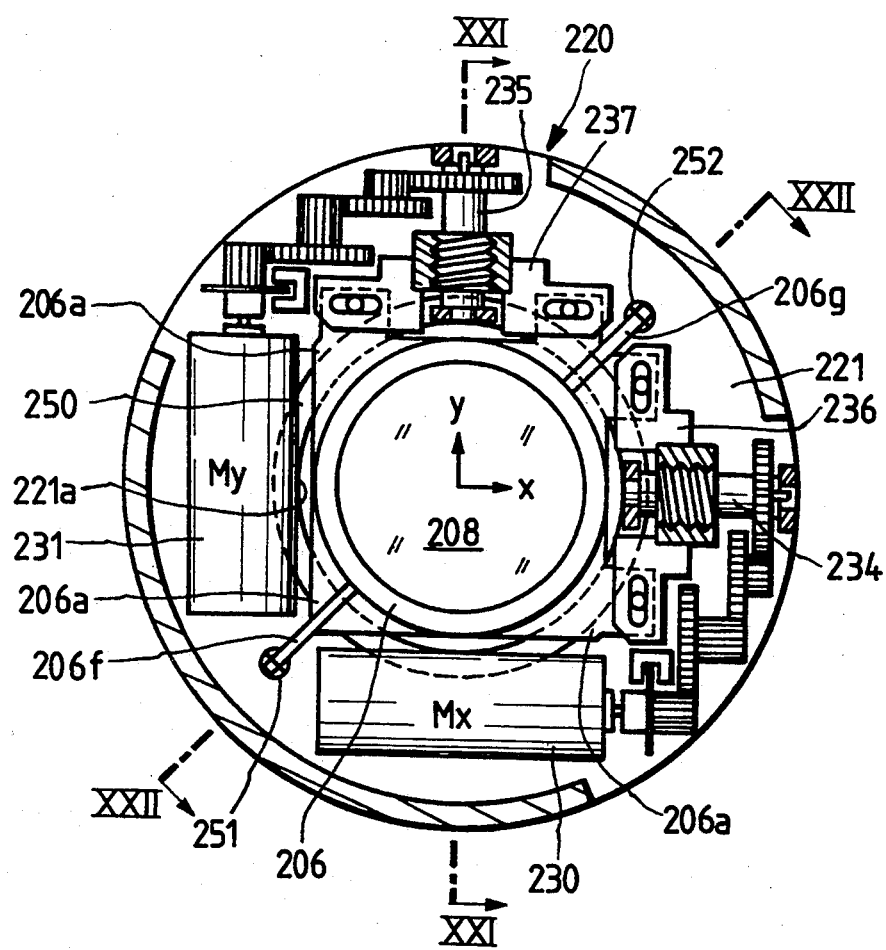
FIG. 20 is a sectional view showing main part of a shake preventing mechanism unit in a lens barrel portion of a camera according to another embodiment of a shake preventing apparatus of the present invention.
Figure 21:
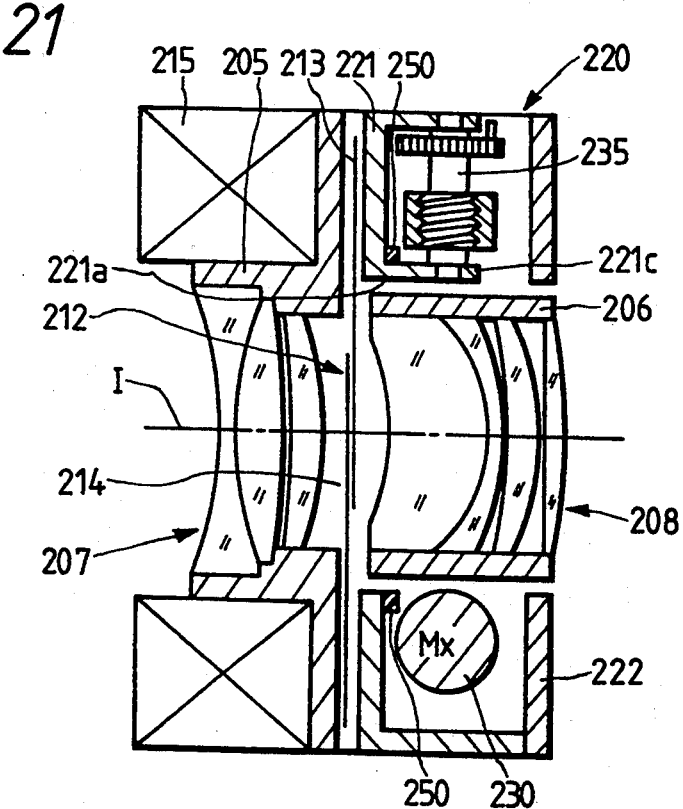
FIG. 21 is a sectional view taken along a line XXI—XXI in FIG. 20.
Figure 22:
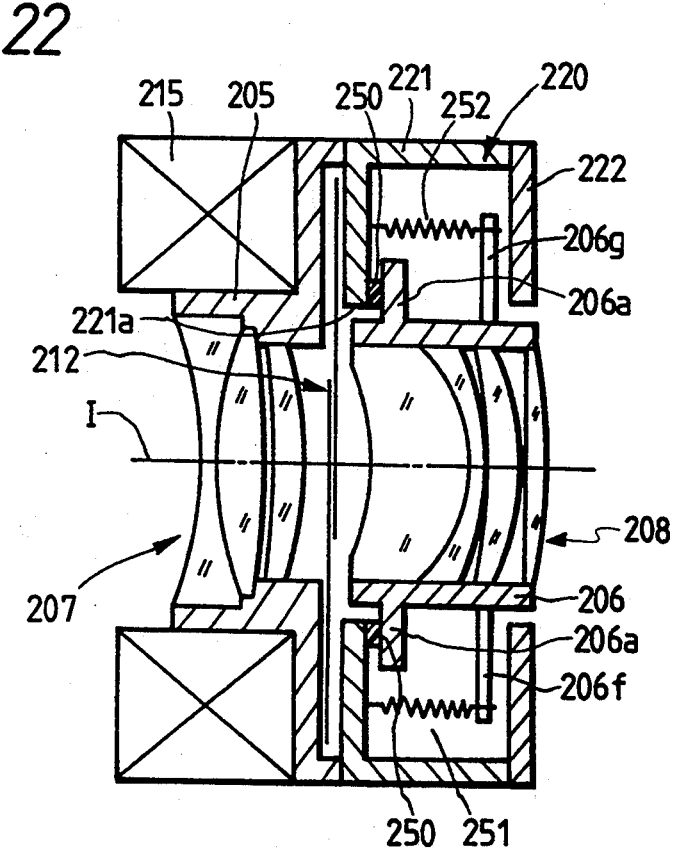
FIG. 22 is a sectional view taken along a line XXII—XXII in FIG. 20.

For example, in the above-mentioned embodiment, the lens frame 206 for holding the shake preventing optical system (shake preventing lens 208) is supported with respect to the stationary portion side (base 221) through the balls 223 and 224 so as to be slidable with less load only perpendicular to the optical axis I. However, the present invention is not limited to this. More specifically, as can be apparent from FIGS. 20 to 22, the lens frame 206 is slidably supported by the base 221 through a sliding member 250 formed of a material having low friction characteristics such as Teflon, a fluorine resin, or the like, and is always biased by springs 251 and 252 so that the flange portion 206a of the lens frame 206 always slidably contacts the sliding member 250. Note that the sliding member 250 is fixed to the base 221, and the springs 251 and 252 extend between the base 221 and arm portions 206f and 206g formed on portions of the lens frame 206.

The sliding member 250 formed of a low-friction member can provide a predetermined slidable support state of the lens frame 206, and the same effect as in the above embodiment can be obtained.

In the above-mentioned embodiment, the present invention is applied to the camera having the lens shutter 212. However, the present invention is not limited to this. That is, the present invention is not limited to the structure of a camera since it need only be applied to a shake preventing lens to be shifted in a direction perpendicular to the optical axis so as to prevent an image blur caused by a camera shake in a conventional camera.

The shake preventing apparatus of the present invention is not limited to the above-mentioned camera, but may be effectively applied to various other optical equipments and apparatuses.

As described above, according to the shake preventing apparatus of the present invention, a driving mechanism driven by a shake detection means and a control means to move a shake preventing optical system in a direction perpendicular to the optical axis is constituted by a first driving means for driving a lens frame member for holding the shake preventing optical system in a first direction, and a second driving means for driving the lens frame member in a second direction different from the first direction. The first driving means has a first coupling member for driving the lens frame member in the first direction, and coupling the lens frame member to be movable in the second direction independently of the first driving means, and the second driving means has a second coupling member for driving the lens frame member in the second direction, and coupling the lens frame member to be movable in the first direction independently of the second driving means. The first and second driving means are arranged at positions shifted, in the circumferential direction, from the movable first and second coupling members on the outer circumferential surface of the lens frame member of the shake preventing optical system so as to have an orthogonal positional relationship with the optical axis. Thus, a shake preventing mechanism unit can be constituted as a unit although it has a simple mechanism structure, thus attaining various effects such as high space factor, low cost, and the like.

In particular, these effects can be further enhanced when the first and second driving means adopt motors and have first and second conversion means for converting rotations of the motors into linear motions in the first and second directions, and the first and second motors are arranged to have their output shafts parallel to the first and second directions, respectively.

Furthermore, according to the present invention, since the shake preventing mechanism unit can be constituted as a compact unit, various other complicated mechanism units such a lens shutter, an aperture stop mechanism, and the like can be arranged adjacent to the shake preventing mechanism unit.

Moreover, according to the present invention, the lens frame member for holding the shake preventing optical system is supported by a stationary portion through a sliding means formed of a low-friction material so as to be slidable with less load in only a direction perpendicular to the optical axis. For this reason, the shake preventing optical system can be moved with less load in the direction perpendicular to the optical axis, and can be moved in a synthesized direction by the first and second driving means for driving the lens frame member in the first and second directions (i.e., the X- and Y-directions) in a desired state.

Still another embodiment of the present invention will be described in detail below with reference to the accompanying drawings.

Figure 23:
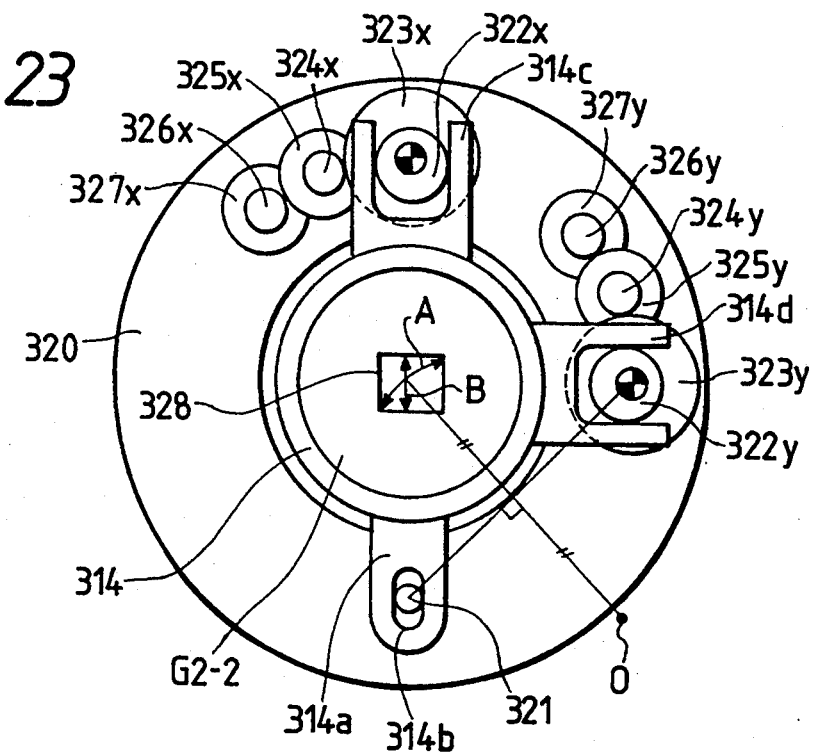
FIG. 23 is a view showing an embodiment of a lens driving apparatus according to the present invention.
Figure 24:
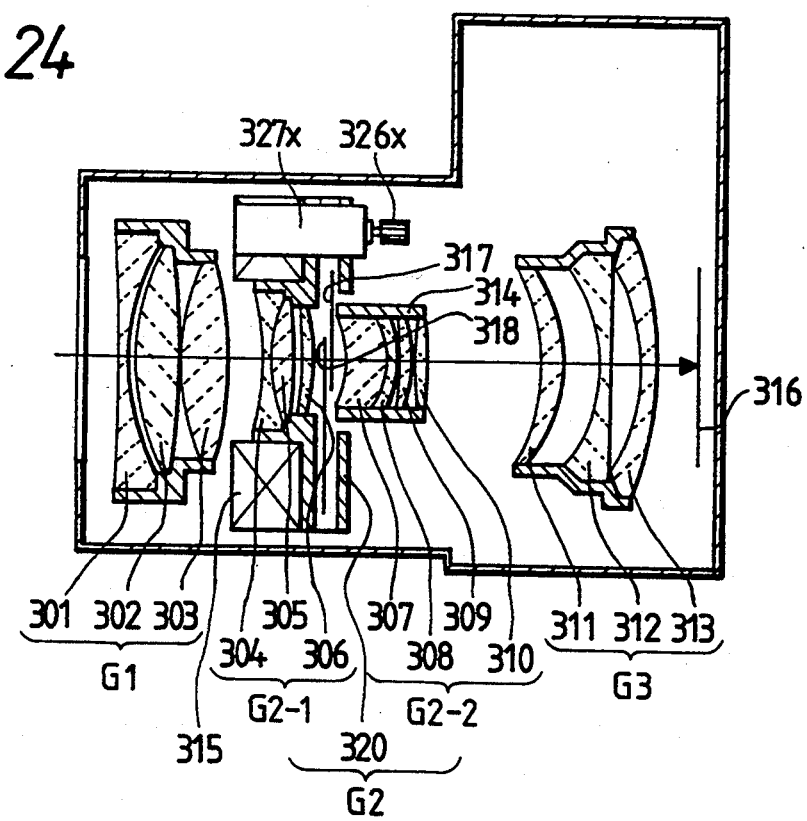
FIG. 24 is a longitudinal sectional view of a camera assembled with the lens driving apparatus according to the embodiment shown in FIG. 23.

FIG. 23 is a front view showing an embodiment of a lens driving apparatus according to the present invention when viewed from the optical axis direction, and FIG. 24 is a longitudinal sectional view of a camera, which adopts the lens driving apparatus according to the embodiment shown in FIG. 23.

In this embodiment, the present invention is applied to a shake correction lens driving apparatus. In the camera shown in FIG. 24, members which are not associated with the shake correction lens driving apparatus are not illustrated.

As shown in FIG. 24, a photographing lens of this camera is constituted by three lens groups, i.e., a first lens group G1 consisting of lenses 301, 302, and 303, a second lens group G2 consisting of lenses 304, 305, 306, 307, 308, 309, and 310, and a third lens group G3 consisting of lenses 311, 312, and 313.

The second lens group G2 can be divided into a lens group G2-1 consisting of the lenses 304, 305, and 306, and a lens group G2-2 consisting of the lenses 307, 308, 309, and 310.

The lens group G2-2 corresponds to a shake correction lens group, and is shifted in a direction perpendicular to the optical axis, thereby preventing an image blur on an imaging plane 316.

Shutter sectors 317 and 318 opened/closed by a shutter driving means 315 are arranged between the lens group G2-1 and the lens group (to be referred to as the shake correction lens group hereinafter) G2-2.

The shake correction lens group G2-2 is held by a lens holding member 314. As shown in FIG. 23, the lens holding member 314 is a single member having a support arm 314a formed with an elongated hole 314b elongated in a direction perpendicular to the optical axis, and driving arms 314c and 314d each having a U-shaped cam groove.

The lens holding member 314 is supported by a hollow disk-like base 320 fixed to a camera main body through a boss 321 and the elongated hole 314b of the support arm 314a.

In the lens holding member 314, an eccentric cam 322x contacts the cam groove of the driving arm 314c, and an eccentric cam 323y contacts the cam groove of the driving arm 314d.

The eccentric cam 322x is coupled to a motor 327x fixed to the camera main body through gears 323x, 324x, 325x, and 326x. The eccentric cam 322y is coupled to a motor 327y fixed to the camera main body through gears 323y, 324y, 325y, and 326y.

The eccentric cam 322x is a cam for generating a driving force in the X-direction (horizontal direction in FIG. 23), and the eccentric cam 322y is a cam for generating a driving force in the Y-direction (vertical direction in FIG. 23). More specifically, when the motor 327x is rotated, the shake correction lens group G2-2 receives the driving force in the X-direction, and when the motor 327y is rotated, the shake correction lens group G2-2 receives the driving force in the Y-direction.

The shift operation of the shake correction lens group G2-2 will be described in detail below.

In FIG. 23, when only the eccentric cam 322x is rotated, the shake correction lens group G2-2 swings using the boss 321 and the eccentric cam 322y as a guide to have a line connecting the central axis of the boss 321 and the rotating shaft of the eccentric cam 322y as an axis of symmetry, and a point O symmetrical with the optical axis of the shake correction lens group G2-2 substantially as a center.

More specifically, when only the eccentric cam 322x is rotated, the shake correction lens group G2-2 curvilinearly moves. An arrow A in FIG. 23 indicates the moving path of the center of the shake correction lens group G2-2 at this time.

On the other hand, when only the eccentric cam 322y is rotated, the shake correction lens G2-2 is moved in the vertical direction using the boss 321 and the eccentric cam 322x as a guide. An arrow B in FIG. 23 indicates the moving path of the center of the shake correction lens group G2-2 at this time.

In the above description, one of the eccentric cams 322x and 322y is driven for the sake of easy understanding. However, in actual shake correction, both the eccentric cams 322x and 322y are driven.

For example, a method of shifting the shake correction lens group G2-2 in only the X-direction will be explained below. When the eccentric cam 322x is driven, the shake correction lens G2-2 is shifted in the direction of the arrow A, and is also shifted in the Y-direction. In order to shift the shake correction lens group G2-2 in a direction opposite to the shift direction in the Y-direction by the same shift amount, the eccentric cam 322y is driven. In order to shift the shake correction lens group G2-2 in only the Y-direction, the eccentric cam 322y is driven.

Therefore, when both the eccentric cams 322x and 322y are driven, the shake correction lens group G2-2 can be shifted within a range 328 in FIG. 23.

Like in this embodiment, when the lens holding member is driven by the cams, the cams are formed into a disk-like shape, and are engaged with the U-shaped cam grooves, each of the cams can be used as a guide upon driving in another direction.

Figure 25:
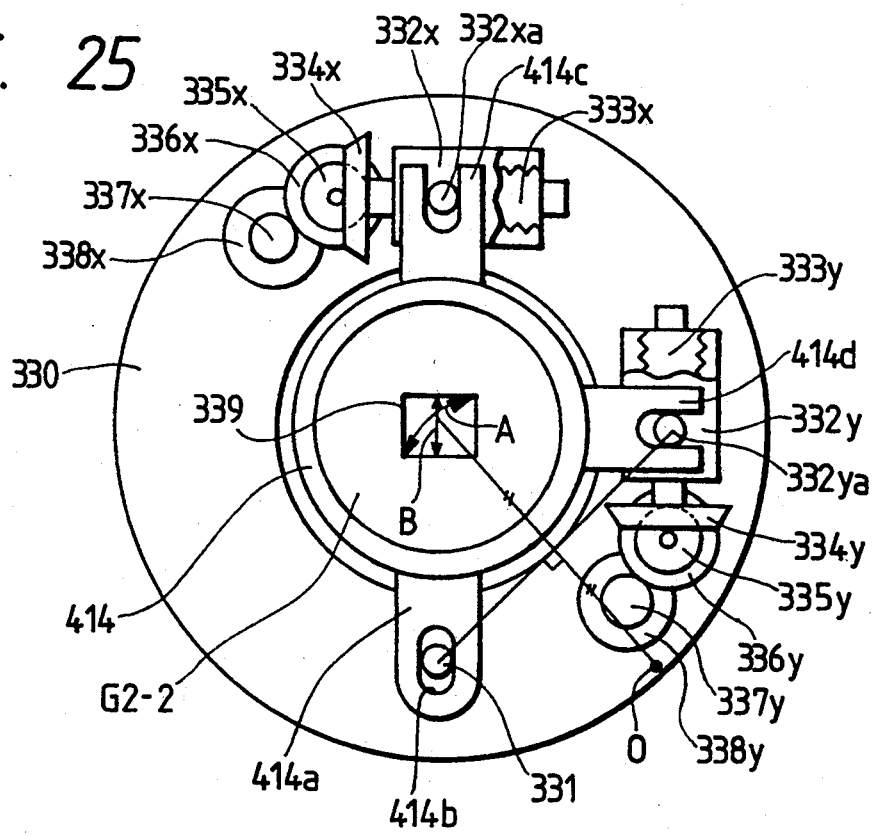
FIG. 25 is a view showing another embodiment of a lens driving apparatus according to the present invention.

FIG. 25 is a front view showing another embodiment of a lens driving apparatus according to the present invention when viewed from the optical axis direction.

In the lens driving apparatus of the above embodiment, the shake correction lens group G2-2 is driven by the cams, but may be driven by a feed screw like in this embodiment.

In FIG. 25, the shake correction lens group G2-2 is held by a lens holding member 414. The lens holding member 414 has a support arm 414a formed with an elongated hole 414b elongated in the radial direction of the lens, and driving arms 414c and 414d each having a U-groove.

The lens holding member 414 is held by a hollow disk-like base 330 fixed to the main body through a boss 331 and the elongated hole 414b of the support arm 414a.

In the lens holding member 414, a boss 332xa of a feed screw 332x extends through the U-groove of the driving arm 414c, and a boss 332ya of a feed screw 332y extends through the U-groove of the driving arm 414d.

The feed screw 332x is coupled to a motor 338x fixed to the camera main body through a screw 333x and gears 334x, 335x, 336x, and 337x. The feed screw 332y is coupled to a motor 338y fixed to the camera main body through a screw 333y and gears 334y, 335y, 336y, and 337y.

The feed screw 332x is a screw for generating a driving force in the X-direction (horizontal direction in FIG. 25), and the feed screw 332y is a screw for generating a driving force in the Y-direction (vertical direction in FIG. 25). More specifically, when the motor 328x is rotated, the shake correction lens group G2-2 receives the driving force in the X-direction, and when the motor 328y is rotated, the shake correction lens group G2-2 receives the driving force in the Y-direction.

The details of the driving method of the shake correction lens group G2-2 are substantially the same as those of the driving apparatus shown in FIG. 23. When only the feed screw 332x is driven, the shake correction lens group G2-2 is curvilinearly moved using the boss 331 and the feed screw 332y as a guide to have a line connecting the central axes of the bosses 331 and 332ya as an axis of symmetry, and a point O symmetrical with the optical axis of the shake correction lens group G2-2 substantially as a center.

More specifically, when only the feed screw 332x is driven, the shake correction lens group G2-2 is curvilinearly moved. An arrow A in FIG. 25 indicates the moving path of the center of the shake correction lens G2-2 at this time.

On the other hand, when only the feed screw 332y is driven, the shake correction lens group G2-2 is moved in the vertical direction using the boss 331 and the feed screw 332x as a guide. An arrow B in FIG. 25 indicates the moving path of the center of the shake correction lens G2-2 at this time. Therefore, the shake correction lens group G2-2 can be shifted within a range 339 in FIG. 25.

In the above embodiment using the eccentric cams, the rotational angles of the motors and the displacements of the driving points (contacts between the cams and the cam grooves) have a nonlinear relationship therebetween. However, when the feed screws are used like in this embodiment, the rotational angles of the motors and the displacements of the driving points (contacts between the boss and the U-grooves in this case) can have a linear relationship therebetween.

Figure 26:
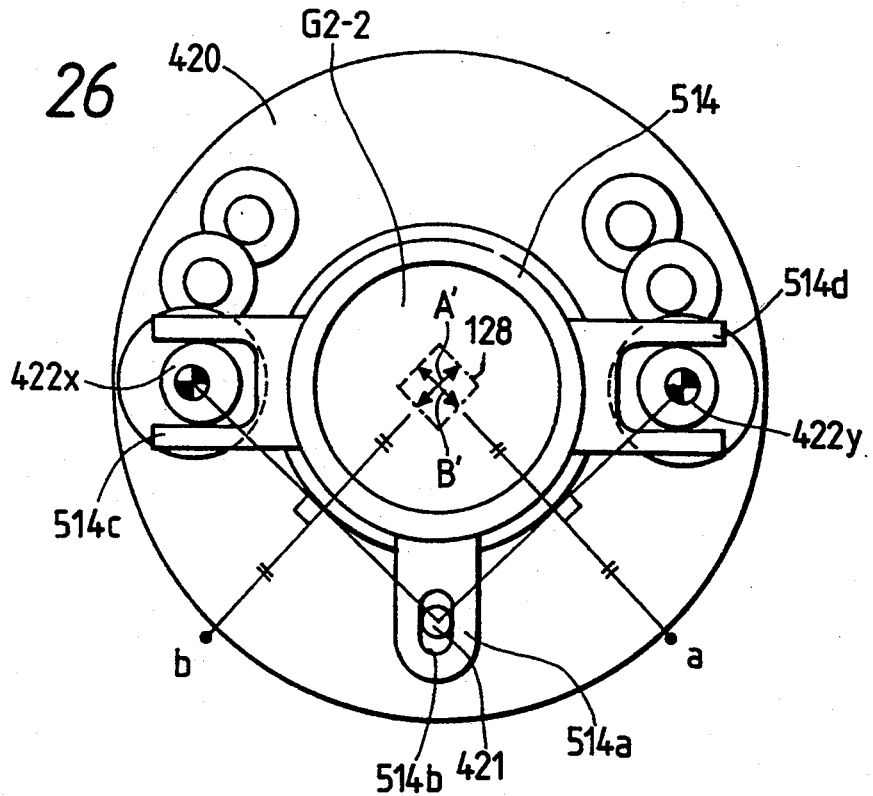
FIG. 26 is a view showing still another embodiment of a lens driving apparatus according to the present invention.

FIG. 26 is a front view showing still another embodiment of a lens driving apparatus according to the present invention when viewed from the optical axis direction.

The lens driving apparatus of this embodiment uses cams like in the embodiment shown in FIG. 23. In the lens driving apparatus of the embodiment shown in FIG. 23, the driving arms 314c and 314d are arranged to be separated at a 90°-interval. However, in this embodiment, driving arms 514c and 514d are arranged to be separated at a 180°-interval.

Since other portions of this embodiment are the same as those in the embodiment shown in FIG. 23, only an operation of this embodiment will be described below.

In FIG. 26, when only an eccentric cam 422x is rotated, the shake correction lens group G2-2 swings using a boss 421 and an eccentric cam 422y as a guide to have a line connecting the central axis of the boss 421 and the rotating shaft of the eccentric cam 422y as an axis of symmetry, and a point a symmetrical with the optical axis of the shake correction lens group G2-2 substantially as a center. More specifically, when only the eccentric cam 322x is rotated, the shake correction lens group G2-2 curvilinearly moves. An arrow A' in FIG. 26 indicates the moving path of the center of the shake correction lens group G2-2 at this time.

On the other hand, when only the eccentric cam 422y is rotated, the shake correction lens G2-2 swings using the boss 421 and the eccentric cam 422x as a guide to have a line connecting the central axis of the boss 421 and the rotating shaft of the eccentric cam 422x as an axis of symmetry, and a point b symmetrical with the optical axis of the shake correction lens group G2-2 substantially as a center. More specifically, when only the eccentric cam 422y is rotated, the shake correction lens group G2-2 is also curvilinearly moved. An arrow B' in FIG. 26 indicates the moving path of the center of the shake correction lens group G2-2 at this time.

In the above description, one of the eccentric cams 422x and 422y is driven for the sake of easy understanding. However, like in the above embodiment, in actual shake correction, both the eccentric cams 422x and 422y are driven.

When both the eccentric cams 422x and 422y are driven, the shake correction lens group G2-2 can be shifted in a range 128 in FIG. 26.

Figure 27:
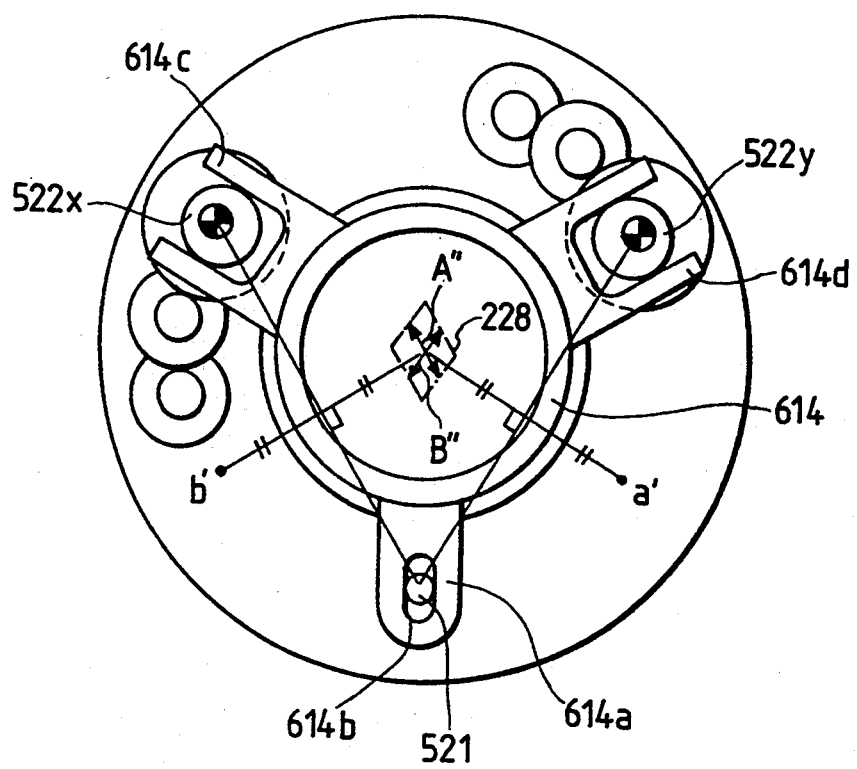
FIG. 27 is a view showing still another embodiment of a lens driving apparatus according to the present invention.

FIG. 27 is a front view showing still another embodiment of a lens driving apparatus according to the present invention when viewed from the optical axis direction.

In the lens driving apparatus of the embodiment shown in FIG. 26, the driving arms 514c and 514d are arranged to be separated at a 180°-interval. However, in this embodiment, driving arms 614c and 614d are arranged to be separated at a 120°-interval. Since other portions of this embodiment are the same as those in the embodiment shown in FIG. 26, only an operation of this embodiment will be described below like in the embodiment shown in FIG. 26.

In FIG. 27, when only an eccentric cam 522x is rotated, the shake correction lens group G2-2 swings using a boss 521 and an eccentric cam 522y as a guide to have a line connecting the central axis of the boss 521 and the rotating shaft of the eccentric cam 522y as an axis of symmetry, and a point a' symmetrical with the optical axis of the shake correction lens group G2-2 substantially as a center. More specifically, when only the eccentric cam 522x is rotated, the shake correction lens group G2-2 curvilinearly moves. An arrow A" in FIG. 27 indicates the moving path of the center of the shake correction lens group G2-2 at this time.

On the other hand, when only the eccentric cam 522y is rotated, the shake correction lens G2-2 swings using the boss 521 and the eccentric cam 522x as a guide to have a line connecting the central axis of the boss 521 and the rotating shaft of the eccentric cam 522x as an axis of symmetry, and a point b' symmetrical with the optical axis of the shake correction lens group G2-2 substantially as a center. More specifically, when only the eccentric cam 522y is rotated, the shake correction lens group G2-2 is also curvilinearly moved. An arrow B" in FIG. 27 indicates the moving path of the center of the shake correction lens group G2-2 at this time.

In the above description, one of the eccentric cams 522x and 522y is driven for the sake of easy understanding. However, like in the above embodiments shown in FIGS. 23 and 26, in actual shake correction, both the eccentric cams 522x and 522y are driven.

When both the eccentric cams 522x and 522y are driven, the shake correction lens group G2-2 can be shifted in a range 528 in FIG. 27.

In the embodiments shown in FIGS. 23, 26, and 27, the cams are used. In the embodiments shown in FIGS. 26 and 27, when the driving arms are symmetrically arranged, the motors can have the same driving conditions.

The above-mentioned lens driving apparatus is an apparatus having a simple structure basically constituted by only the lens holding frame, the cam mechanism or the feed screw mechanism, and the driving means. In addition, since the lens can be shifted in both the X- and Y-directions by the single lens holding frame, the lens driving apparatus can be arranged in a small space.

In each of the above embodiments, the shake correction lens driving apparatus has been described. However, the lens driving apparatus of the present invention may be used as, e.g., a driving/adjustment apparatus of a sensor.

As described above, the lens driving apparatus of the present invention has a simple structure and requires only a small space, thus contributing to a compact structure of a lens barrel.

What is claimed is:

1. A camera comprising a lens barrel and including, internally of said lens barrel:
an aperture stop mechanism unit;
a base having a mounting portion extending transversely to an optical axis of said lens barrel, said aperture stop mechanism unit being mounted to said mounting portion;
a shake correction lens juxtaposed with a photographing lens in a direction of said optical axis; and
driving means for moving said shake correction lens in a direction perpendicular to the optical axis direction, said driving means including a motor mounted on said mounting portion.

2. A camera comprising a lens barrel and including, internally of said lens barrel:
an aperture stop mechanism unit;
a first base having a mounting portion extending transversely to an optical axis of said lens barrel, said aperture stop mechanism unit being mounted to said mounting portion;
a second base integrated with said first base and having a mounting portion extending transversely to said optical axis;
a shake correction lens juxtaposed with a photographing lens in a direction of said optical axis; and
driving means for moving said shake correction lens in a direction perpendicular to the optical axis direction, said driving means including a motor mounted on said mounting portion of said second base.

3. A camera comprising:
a lens group arranged near aperture blades and on a side of a film with respect to the aperture blades in an optical axis direction; and
driving means including a motor for moving said lens group in a direction perpendicular to the optical axis direction,
at least a portion of said motor being arranged on a side of an object in the optical axis direction with respect to the aperture blades.

4. A camera according to claim 3, further comprising:
a first base arranged on the side of the object in the optical axis direction with respect to the aperture blades and having a mounting portion extending transversely to the optical axis;
a second base arranged on the side of the film in the optical axis direction with respect to the aperture blades and having a mounting portion extending transversely to the optical axis; and
guide means, arranged on said mounting portion of second base, for guiding the movement of said lens group,
said motor being mounted on one of said first and second bases.

5. A camera according to claim 3, further comprising:
vibration detection means, arranged on said mounting portion of said second base, for detecting a vibration of the camera.

6. A camera according to claim 3, wherein said driving means includes an additional motor at least a portion of which is arranged on the side of the object in the optical axis direction with respect to the aperture blades, the aperture blades include two blades, and said motors and centers of rotation of the aperture blades are arranged substantially symmetrically with respect to an axis perpendicular to a line connecting the centers of rotation of the aperture blades, and perpendicular to the optical axis direction.

7. A camera comprising:
distance-measurement means for measuring a distance to an object;
focusing means for performing a focusing operation on the basis of a distance-measurement result from said distance-measurement means;
shutter means movable for starting an exposure operation;
shake detection means for detecting a shake amount of an image on an imaging plane;
correction lens means;
driving means for moving said correction lens means in a direction perpendicular to an optical axis on the basis of a detection result of said shake detection means; and
control means for determining a predetermined timing between an end of a focusing operation of said focusing means and the start of the exposure operation by said shutter means, and controlling said driving means to start movement of said correction lens at the predetermined timing.

8. A camera according to claim 7, wherein said shake detection means comprises an angular speed sensor.

9. A camera according to claim 7, wherein the predetermined timing is determined in consideration of an inertia of a driving system of said driving means.

10. A shake correction optical apparatus comprising:
shake detection means for detecting a shake;
a shake correcting optical system movable in a direction perpendicular to an optical axis of a main optical system;
a driving mechanism for driving said shake correcting optical system; and
control means for controlling said driving mechanism to effect shake correction on the basis of a detection result of said shake detection means,
wherein said driving mechanism includes a lens frame holding member for holding said shake correcting optical system, first driving means for generating a driving force for driving said lens frame holding member in a first direction, and second driving means for generating a driving force for driving said lens frame holding member in a second direction different from the first direction,
said first driving means is coupled to said lens frame holding member by a first coupling member, such that the first driving force is transmitted from said first driving means to said lens frame holding member through said first coupling member, and the second driving force is not transmitted from said second driving means to said lens frame holding member through said first coupling member,
said second driving means is coupled to said lens frame holding member by a second coupling member, such that the second driving force is transmitted from said second driving means to said lens frame holding member through said second coupling member, and the first driving force is not transmitted from said first driving means to said lens frame holding member through said second coupling member, said first and second coupling members are arranged about an outer periphery of said lens frame holding member, said first and second driving means have portions arranged about the outer periphery of said lens frame holding member at positions different from positions of said first and second coupling members in a circumferential direction, and said first and second driving means respectively comprise first and second motors, first and second conversion means for respectively converting rotations of output shafts of said motors into linear motions in the first and second directions, and said first and second motors are arranged so that output shafts thereof extend parallel to the first and second directions, respectively.

11. An apparatus according to claim 10, wherein said first and second motors are arranged near circumferentially adjacent portions of the outer periphery of said lens frame holding member.

12. An apparatus according to claim 10, further comprising:

sliding means, including a low-friction member, for supporting said lens frame holding member so that said lens frame holding member is slidable with a low driving force only in directions perpendicular to the optical axis.

13. A lens driving apparatus comprising:

a stationary portion;

a lens;

a frame member which holds said lens and is movable in a direction perpendicular to an optical axis of said lens with respect to said stationary portion;

first driving means, contacting a first portion of said frame member, for pressing said frame member to move said frame member along a first path;

second driving means, contacting a second portion of said frame member different from the first portion, for pressing said frame member to move said frame member along a second path; and a guide member provided on said stationary portion and cooperable with a third portion of said frame member different from the first and second portions to allow linear and pivotal movement of said frame member with respect to said stationary portion, such that movement of said frame member along said first path is guided at the second and third portions, and movement of said frame member along said second path is guided at the first and third portions.

14. An apparatus according to claim 13, wherein each of said first and second driving means comprises an eccentric cam mechanism.

15. An apparatus according to claim 13, wherein each of said first and second driving means comprises a feed screw mechanism.

16. An apparatus according to claim 13, wherein one of the first and second portions of said frame member is arranged on a line passing through the third portion of said frame member and perpendicular to the optical axis of said lens.

17. An apparatus according to claim 13, wherein the first and second portions of said frame member are arranged at substantially symmetrical positions with respect to a line passing through the third portion of said frame member and perpendicular to the optical axis of said lens.

18. An apparatus according to claim 13, wherein the first and second portions of said frame member are arranged on a line perpendicular to the optical axis of said lens.

19. A camera comprising a lens barrel and including, internally of said lens barrel:

a lens shutter mechanism unit;

a base having a mounting portion extending transversely to an optical axis of said lens barrel, said lens shutter mechanism unit being mounted to said mounting portion;

a shake correction lens juxtaposed with a photographing lens in a direction of said optical axis; and driving means for moving said shake correction lens in a direction perpendicular to the optical axis direction, said driving means including a motor mounted on said mounting portion.

20. A camera comprising a lens barrel and including, internally of said lens barrel:

a lens shutter mechanism unit;

a first base having a mounting portion extending transversely to an optical axis of said lens barrel, said lens shutter mechanism unit being mounted to said mounting portion;

a second base integrated with said first base and having a mounting portion extending transversely to said optical axis;

a shake correction lens juxtaposed with a photographing lens in a direction of said optical axis; and driving means for moving said shake correction lens in a direction perpendicular to the optical axis direction, said driving means including a motor mounted on said mounting portion of said second base.

21. A camera comprising:

a lens group arranged near shutter blades on a side of a film with respect to said shutter blades in an optical axis direction; and driving means including a motor for moving said lens group in a direction perpendicular to the optical axis direction, at least a portion of said motor being arranged on a side of an object in the optical axis direction with respect to the shutter blades.

22. A camera according to claim 21, further comprising:

a first base arranged on the side of the object in the optical axis direction with respect to the shutter blades and having a mounting portion extending transversely to the optical axis;

a second base arranged on the side of the film in the optical axis direction with respect to the shutter blades and having a mounting portion extending transversely to the optical axis; and guide means, arranged on said mounting portion of said second base, for guiding the movement of said lens group, said motor being mounted on one of said first and second bases.

23. A camera according to claim 21, further comprising:

vibration detection means, arranged on said mounting portion of said second base, for detecting a vibration of the camera.

24. A camera according to claim 21, wherein said driving means includes an additional motor at least a portion of which is arranged on the side of the object in the optical axis direction with respect to the aperture blades, the shutter blades include two blades, and said motors and centers of rotation of the shutter blades are arranged substantially symmetrically about an axis perpendicular to a line connecting the centers of rotation of the shutter blades, and perpendicular to the optical axis direction.

* * * * *